US012333881B1

(12) United States Patent
Lemmon et al.

(10) Patent No.: US 12,333,881 B1
(45) Date of Patent: Jun. 17, 2025

(54) GROUP DETERMINATION AND ASSOCIATION

(71) Applicant: Amazon Technologies, Inc., Seattle, WA (US)

(72) Inventors: Michael Lemmon, Seattle, WA (US); Vinodh Muthiah, Seattle, WA (US); Yi Xiang, Seattle, WA (US); Timothy Liaw, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 18/171,589

(22) Filed: Feb. 20, 2023

Related U.S. Application Data

(63) Continuation of application No. 16/714,003, filed on Dec. 13, 2019, now Pat. No. 11,587,384.

(51) Int. Cl.
 G06Q 20/20 (2012.01)
 G06Q 30/0601 (2023.01)
 G07C 9/29 (2020.01)

(52) U.S. Cl.
 CPC ............ G07C 9/29 (2020.01); G06Q 20/204 (2013.01); G06Q 30/0635 (2013.01)

(58) Field of Classification Search
 CPC ..... H04L 67/306; H04L 67/18; G06Q 30/064; G06Q 20/385; G06Q 10/06; G06Q 40/02; G06Q 20/347; G06Q 20/40; G06Q 30/02; G06Q 30/06
 USPC .................. 705/13, 7.34, 7.33, 26.62, 26.82; 235/381, 382.5
 See application file for complete search history.

(56) References Cited

U.S. PATENT DOCUMENTS

| 5,666,157 A | 9/1997 | Aviv |
| 5,875,305 A | 2/1999 | Winter et al. |
| 6,876,977 B1* | 4/2005 | Marks .................... G06Q 30/06 705/26.82 |
| 7,225,980 B2 | 6/2007 | Ku et al. |
| 7,949,568 B2 | 5/2011 | Fano et al. |

(Continued)

FOREIGN PATENT DOCUMENTS

WO  0146916 A2  6/2001

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Olusegun Goyea
(74) *Attorney, Agent, or Firm* — Athorus, PLLC

(57) ABSTRACT

Described are implementations that facilitate group determination and association at entry into a facility so that activities of group members of the group are associated with the group and/or applied to a single account designated for the group. For example, if four individuals enter the facility together, the disclosed implementations determine whether the four individuals are to be associated as a group. If associated as a group, an account, such as an account of one of the individuals, is also determined and associated with the group. Activities, such as an item pick, performed by one of those individuals is associated with the group and if there is a fee or charge associated with the activity it is applied to the associated account.

20 Claims, 25 Drawing Sheets

(56) References Cited

U.S. PATENT DOCUMENTS

| | | | |
|---|---|---|---|
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,235,928 B2 | 1/2016 | Medioni et al. | |
| 9,473,747 B2 | 10/2016 | Kobres et al. | |
| 9,605,973 B2 * | 3/2017 | Kobuya | G09B 29/008 |
| 9,706,835 B2 * | 7/2017 | Zaniker | G06Q 20/352 |
| 10,007,892 B1 | 6/2018 | Hahn et al. | |
| 10,380,814 B1 * | 8/2019 | Mathiesen | G07C 9/253 |
| 10,445,593 B1 * | 10/2019 | Mathiesen | G06V 20/53 |
| 10,602,364 B2 * | 3/2020 | Diem | H04W 4/20 |
| 2003/0002712 A1 | 1/2003 | Steenburgh et al. | |
| 2004/0181467 A1 | 9/2004 | Raiyani et al. | |
| 2006/0284893 A1 * | 12/2006 | Hlad | H04L 51/216 |
| | | | 345/684 |
| 2007/0299710 A1 * | 12/2007 | Haveliwala | G06Q 10/10 |
| | | | 705/7.19 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2011/0032353 A1 | 2/2011 | Vallone et al. | |
| 2012/0180103 A1 | 7/2012 | Weik, III et al. | |
| 2012/0232958 A1 * | 9/2012 | Silbert | G06Q 30/02 |
| | | | 705/7.33 |
| 2012/0284132 A1 | 11/2012 | Kim et al. | |
| 2012/0323643 A1 * | 12/2012 | Volz | G06Q 30/0631 |
| | | | 705/13 |
| 2013/0076898 A1 | 3/2013 | Philippe et al. | |
| 2013/0119129 A1 * | 5/2013 | Amdahl | G06Q 20/4014 |
| | | | 235/382.5 |
| 2013/0253700 A1 | 9/2013 | Carson et al. | |
| 2013/0284806 A1 | 10/2013 | Margalit | |
| 2014/0019241 A1 | 1/2014 | Treiser et al. | |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0086107 A1 | 3/2015 | Dedeoglu et al. | |
| 2016/0055692 A1 | 2/2016 | Trani | |
| 2016/0323274 A1 | 11/2016 | Chandrasekaran et al. | |
| 2017/0228804 A1 * | 8/2017 | Soni | H04L 67/535 |
| 2018/0004384 A1 * | 1/2018 | Fitzgerald | G06F 3/04817 |
| 2018/0101833 A1 * | 4/2018 | Parekh | G06Q 20/38215 |
| 2019/0318276 A1 * | 10/2019 | Rouveure | G06Q 10/02 |
| 2019/0333351 A1 * | 10/2019 | Peixoto Guimaraes Ubirajara E Silva | G08B 13/19608 |
| 2020/0005319 A1 * | 1/2020 | Scarborough | G06Q 10/087 |
| 2020/0334765 A1 * | 10/2020 | Norris | H04N 7/157 |
| 2020/0410421 A1 * | 12/2020 | Nelson | G06Q 10/06312 |
| 2020/0413230 A1 * | 12/2020 | Vengroff | H04W 8/186 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Vaive Kalnikaite et al., "How to Nudge In Situ: Designing Lambent Devices to Deliver Information Salience in Supermarkets", Ubicomp '11 Proceedings of the 13th International Conference on Ubiquitous Computing, 2011, pp. 11-20, Publisher: ACM New York, NY, USA.

Vu, T. et al., "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

* cited by examiner

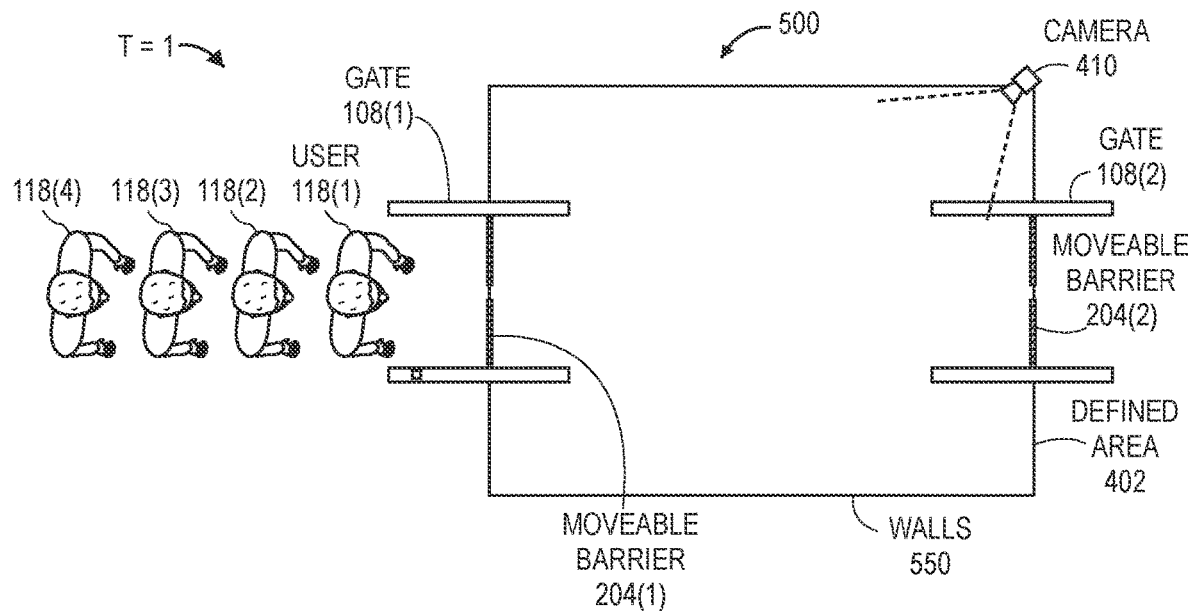
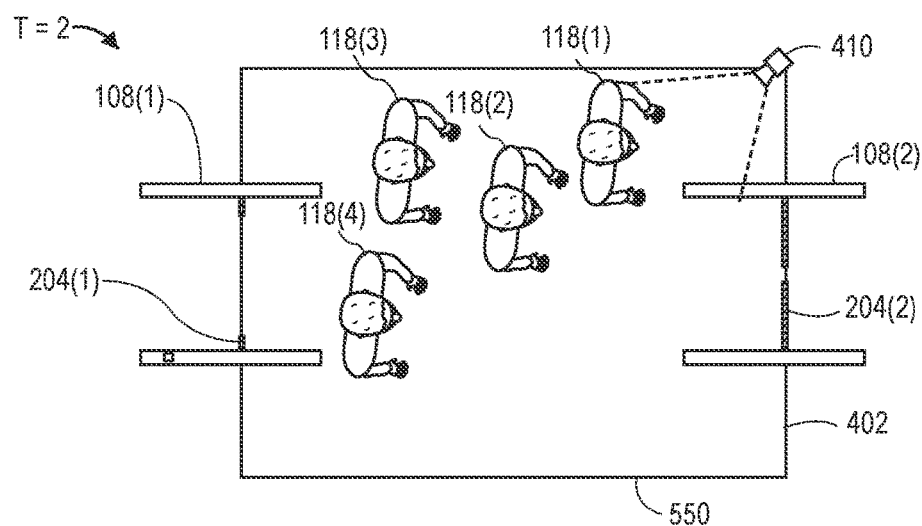
FIG. 5A

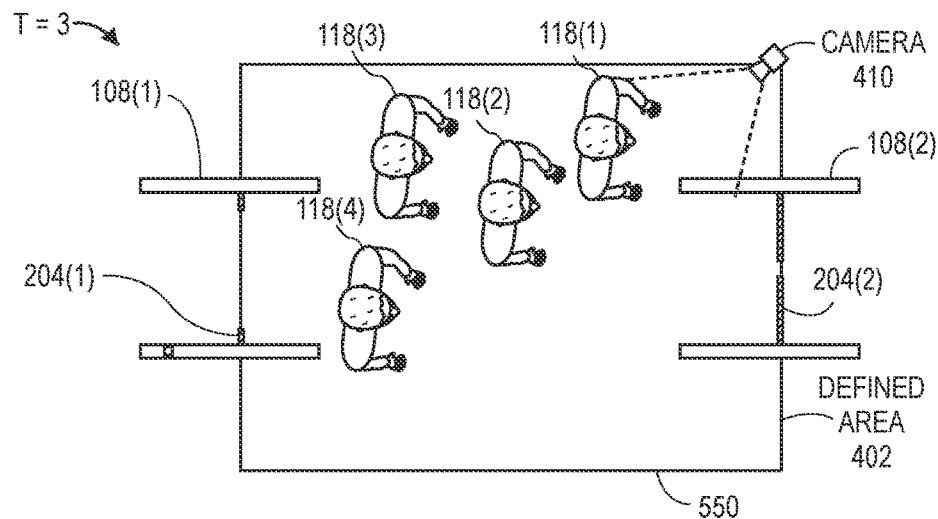
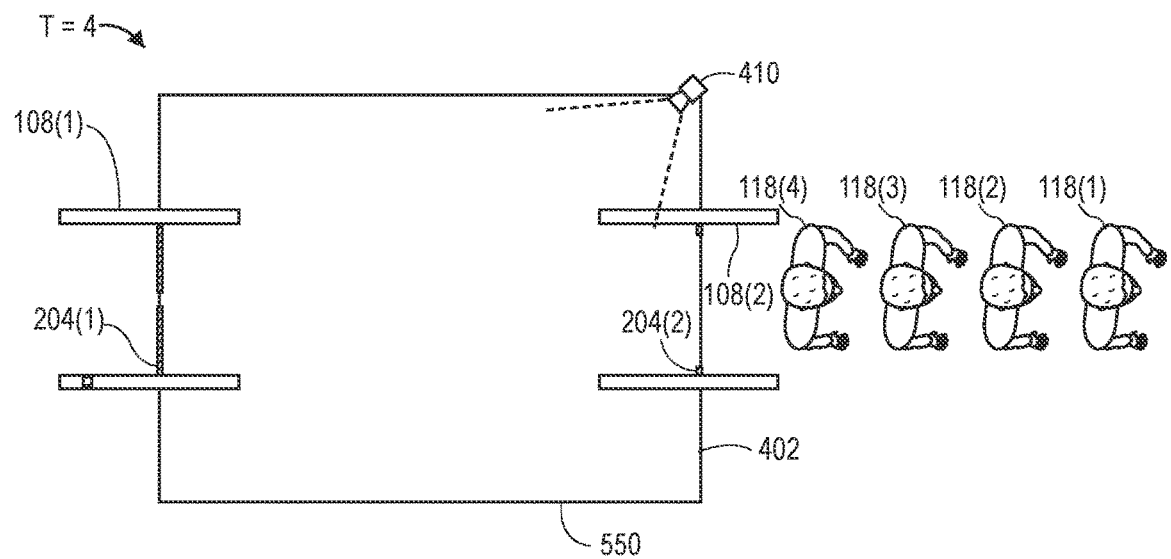
FIG. 5B

| GROUPING CONDITION 1102 | VALUE (PER OCCURRENCE) 1104 | COUNT OF OCCURRENCE 1106 | SESSION SCORE 1108 |
|---|---|---|---|
| PERSON PRESENT AT GATE AT FIRST ENTRY TIME | 1 | 1 | 1 |
| FIRST ENTRY TIME AND SECOND ENTRY TIME WITHIN FIRST THRESHOLD TIME OF ONE ANOTHER | 10 | 1 | 10 |
| GATE BARRIER WAS OPEN(ED) AT FIRST ENTRY TIME | 2 | 1 | 2 |
| FIRST USER AND SECOND USER ENTER USING SAME GATE | 2 | 1 | 2 |
| MADE SCAN GESTURE | -10 | 0 | 0 |
| IDENTIFICATION DATA OBTAINED FROM SCAN | -50 | 0 | 0 |
| USER UNDER THRESHOLD HEIGHT | 10 | 1 | 10 |
| FIRST USER WITHIN THRESHOLD DISTANCE OF SECOND USER WHILE IN FACILITY (PER OCCURRENCE) | 5 | 10 | 50 |
| FIRST USER AND SECOND USER FACE EACH OTHER WHILE IN FACILITY (PER OCCURRENCE) | 5 | 6 | 30 |
| OBJECT PASSED BETWEEN FIRST USER AND SECOND USER OR PLACED IN SAME CART (PER OCCURRENCE) | 20 | 7 | 140 |
| USER HAS HISTORY OF BRINGING GUEST | 5 | 1 | 5 |
| FIRST USER AND SECOND USER EXIT WITHIN THRESHOLD TIME OF ONE ANOTHER | 50 | 1 | 50 |
| FIRST USER AND SECOND USER EXIT FROM SAME GATE | 20 | 1 | 20 |
| TOTAL SESSION SCORE 1110 | | | 320 |

FIG. 11

GROUP DETERMINATION AND ASSOCIATION

PRIORITY CLAIM

This application is a Continuation of U.S. patent Ser. No. 11,587,384, filed on Dec. 13, 2019, issued on Feb. 21, 2023, and titled "Group Determination and Association," the contents of which are herein incorporated by reference.

BACKGROUND

Facilities such as stores, libraries, hospitals, offices, and so forth, may need the ability to identify users in the facility who are associated with one another. Current systems require either single entry verification for each individual (e.g., individual tickets) or an agent to review and verify the number of individuals in a group. However, even in these situations, once the group has entered there is no ability to maintain group identification or relationship within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 3 through 6B illustrate example implementations of individuals passing through a gate and respective group determinations, in accordance with implementations of the present disclosure.

FIG. 11 illustrates a table of various grouping conditions and values that may be used to determine a total session score for a session that is indicative of whether a user is a member of a group, in accordance with implementations of the present disclosure.

DETAILED DESCRIPTION

Figure 1:
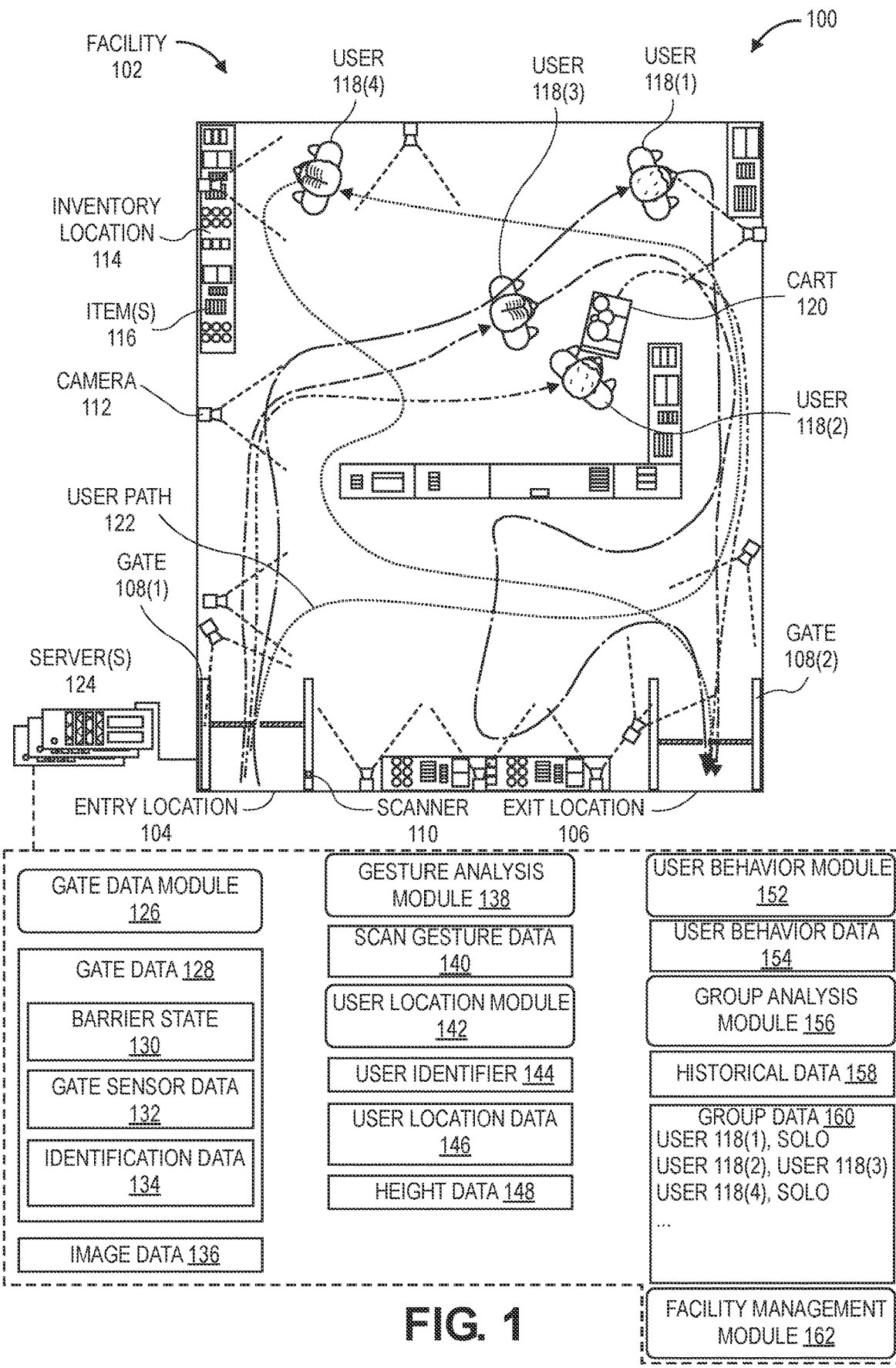
FIG. 1 illustrates a system to determine whether users at a facility are part of a group, in accordance with implementations of the present disclosure.

Described are implementations that facilitate group determination and association at entry into a facility so that activities of group members of the group are associated with the group and/or applied to a single account designated for the group. For example, if the facility is a retail establishment and a family that includes a mother, father, and two children enter the facility, the disclosed implementations determine the four individuals (mother, father, and two children) are together and associate those individuals as a group. In addition, an account, such as an account corresponding to the mother, is also determined and associated with the group. Any activities, such as an item pick, performed by one of those individuals is associated with the group and if there is a fee or charge associated with the activity it is applied to the associated account-in this example the account of the mother.

In some implementations, a user, during entry, may provide a group entry indication. The group entry indication may include one or more of an indicated quantity of individuals to include in the group, a range of a quantity of individuals included in the group, an authorized user identifier, an account identifier, etc. For example, a user may interact with an input/output device ("I/O device") at the entry location to the facility and select a group entry option presented on the I/O device corresponding to the quantity of individuals in the group. Selection of the group entry option may result in the I/O device generating and providing the group entry indication with an indicated quantity of individuals corresponding to the selected option.

In other examples, the group entry indication may not indicate a quantity of individuals but rather a start time at which the disclosed implementations monitor for individuals entering or passing through the entry location. In such an implementation, monitoring may be performed until a second time that is later than the start time (also referred to herein as a first time) is reached and the quantity of individuals detected entering or passing through the entry location may be allocated to the group. For example, a first user may insert or provide an identifier, such as a credit card, to the I/O device, thereby initiation the start time for monitoring. Upon insertion of the identifier, other individuals to be included in the group may pass through the entry location.

After the individuals have passed through the entry location, the user may remove the identifier and pass through the entry location, thereby indicating the stop time. In such an example, the disclosed implementations detect the individuals passing through the entry location between the start time and stop time and associate those individuals as a group, along with the user. In addition, the user may be identified based on the provided identifier and an account of the user associated with the group.

In still other examples, individuals of a group may pass through the entry location and gather within a defined location. Once each individual is in the defined location, the system may determine the individuals and associate them with the group.

As discussed further below, in some implementations, during entry, users may pass through a gate at an entry location to a facility. The gate may provide gate data indicative of when the gate was open, data indicative of a count or quantity of people determined to have passed the gate while the gate was open, identification data that was presented at the gate, and so forth. For example, the gate may include a scanner with a camera, and the identification data may comprise an image of a user's palm, an image of a smartphone presenting a machine-readable code, an image of an identification card, and so forth. In other implementations, the gate may be omitted from the entry location.

Cameras at the facility may acquire image data. For example, cameras may acquire images of the entry gate. This image data may be processed to determine if the user made a scan gesture. For example, the scan gesture may comprise movement of an arm towards, over, and away from the scanner. The image data may also be used to determine other information, such as a count of users who entered through the entry gate and/or activities or actions performed by users while located in the facility During operation of the facility, those users who are attending by themselves may typically be expected to present their identification data at the gate, such that each person is associated with identification data, resulting in one scan of identification data and one entry of a person. A user with guests may present their identification data once for each guest who passes through the gate, again producing one scan per person entering. In other examples, the user may present their identification data once and indicate that a group is to be formed and associated with that user or an account of that user.

In such examples, the group entry indication may include an indicated quantity of individuals to include in the group. The cameras or other monitoring devices may monitor the entry location and determine an actual quantity of individuals entering or passing through the entry location and a determination may be made as to whether the indicated quantity of individuals corresponds to the actual quantity of individuals detected. If the actual quantity of individuals corresponds to the indicated quantity of individuals, a group may be formed for those individuals. If the actual quantity of individuals does not correspond to the indicated quantity of individuals, the user and/or an agent at the facility may be notified and a resolution obtained. For example, the user may be notified of the difference and confirm that the actual quantity of individuals is accurate, and the group should be formed for those individuals. Alternatively, the user may indicate which individual or individuals should or should not be included in the group.

User location data indicative of a location of each individual at or near the entry location and elsewhere within the facility is determined from image data generated by cameras within the facility. Each user may be assigned a user identifier. The user identifiers distinguish one user in the facility at that time from another and are not necessarily indicative of a definitive unique identity of the individual. For example, the user identifiers may be serial numbers that are assigned in sequential order, randomly generated and assigned, etc., regardless of the actual identity of the individual they represent.

Other data about the users may be determined based on image data or data obtained from other sensors. For example, the cameras may provide depth data that may be used to determine an estimated height of the users.

Group data may be generated that is indicative of whether the first user identifier is associated with the second user identifier. This determination may be based on assessing one or more conditions that are suggestive of grouping as compared to one or more of the gate data, the image data, gesture data, user location data, height data, user behavior data, historical data, and so forth. In one implementation, based on the data available, a score may be calculated for each user identifier that is indicative of whether that user is by themselves or a member of a group. For example, presentation of identification data may decrease the score while failure to present identification data may increase the score.

The group data may also be based on information about user behaviors. For example, if the first user and the second user remain close to one another while in the facility, they may comprise a group. In another example, if the first user and the second user exited the facility at about the same time and by the same exit location, this may be indicative of those users comprising a group.

Once group data has been determined, other interactions within the facility may be attributed to an appropriate account. For example, as the authorized user and their guest travel through the facility, when the guest picks an item and they leave the facility, the account associated with the group may billed for the item.

A facility, as used herein, may be any type of facility or location at which it may be desirable to group two or more people. For example, a facility may be, but is not limited to, a warehouse, a museum, a park, an amusement park, a hotel, a library, a mall, a retail establishment (e.g., store), a stadium, an event center, a transportation facility (e.g., airport, bus station, subway, ferry terminal, train station), a private facility, etc. As discussed, information or accounts associated with one or more individuals of the group may be maintained and associated with a determined group as the group enters the facility so that activities or actions of those group members can be allocated to and/or charged to that account.

The techniques and systems described in this disclosure offer significant technological improvements. Compared to previous systems that required strict adherence to "one scan, one person," the systems described herein allow for an automated system to efficiently and accurately identify groups of users in a dynamically changing environment without human intervention. This significantly increases the number of users who may pass through an entry in a given amount of time, allowing either the use of fewer entry locations or allowing more users to use the facility. In addition, other systems involved in managing the facility realize significant improvements in data quality and operation by having at least one account associated with each user within the facility. Also, the techniques and systems described herein allow guests of a user to enter the facility without necessarily being enrolled in the system. In comparison, traditional techniques may have involved the user and their guest using a special entry process, such as stopping at a security desk to receive temporary credentials, and so forth.

FIG. 1 illustrates a system 100 to determine whether users at a facility are part of a group, according to some implementations. A facility 102 may include one or more portals such as one or more entry locations 104 and one or more exit location 106. Each entry location 104 and exit location 106 may include one or more gates 108.

In some implementations, the gate 108 may include a movable barrier to control movement of users. For example, the gate 108 may include computer-controlled panels that may be closed to impede passage of the user or opened to permit passage of the user. The gate 108 may include one or more of a scanner 110 or other sensor. For example, the scanner 110 may be placed in a pedestal or console on one side of the gate 108, and comprise a camera having a field of view that is directed upward.

The facility 102 may include cameras 112. Some of these cameras 112 may have their respective fields of view directed towards inventory locations 114. The inventory locations 114 may include one or more of a platform, a rack, a case, a cabinet, a bin, a floor location, or other suitable storage mechanisms for holding, supporting, or storing items 116.

During use, a user 118 may approach the gate 108 at the entry location 104 and present to the scanner 110 something that is used to provide identification data. For example, if the identification data is based on biometric information, the scanner 110 may obtain an image of the user's 118 hand or portion thereof. In another example, the identification data may be obtained from a machine-readable code that is presented on a display of a smartphone that the user 118 presents to the scanner 110. In yet another example, the identification data may be obtained from a pre-printed card that the user 118 presents to the scanner 110. In other implementations, the scanner 110 comprise a radio-frequency identification (RFID) reader, Bluetooth transceiver, and so forth.

The users 118, also referred to herein as individuals, may include humans, robots, animals, etc. For example, the user 118 may go to the facility 102, bringing a robot, guide dog, etc., to assist them.

The user 118 uses the entry location 104 and passes through the gate 108(1) into the facility 102. While in the facility 102, the user 118 may utilize a cart 120. The user 118 may move about the facility 102, with those movements indicated in this illustration by a user path 122. The user 118 may pick items 116 from the inventory locations 114 and place them in the cart 120, or return items 116 to the inventory locations 114. Eventually, the user 118 concludes their visit and leaves the facility 102 by passing through the gate 108(2) at the exit location 106. In some implementations, a single gate 108 may operate as both an entry location 104 and an exit location 106 at the same time. For example, users 118 may enter and exit through gate 108(1). In other implementations a gate 108 may operate as an entry location 104 at one time, and an exit location 106 at another time. For example, during peak hours more gates 108(1) may be designated as entry locations 104 to allow more users 118 to enter. Users 118 may enter and exit the facility 102 using the same or different gates 108. For example, as depicted in FIG. 1, user 118(1) may enter through gate 108(1) and exit through gate 108(2).

In this illustration, four users 118(1)-(4) are depicted. For sake of illustration, and not necessarily as a limitation, user 118(1) is alone, user 118(2) is an authorized user with user 118(3) as a guest, and user 118(4) is alone. One or more servers 124 may perform the various operations described below.

A gate data module 126 may receive data associated with operation of the gate 108. The gate data module 126 produces gate data 128 that may include one or more of barrier state 130, gate sensor data 132, or identification data 134. The barrier state 130 may comprise data indicative of whether the movable barrier at the gate 108 is open or closed at particular times. The gate sensor data 132 may comprise data from sensors at the gate 108 such as proximity sensors, pressure sensors, optical sensors, torque sensor for the moveable barrier, and so forth. For example, the gate sensor data 132 may comprise data obtained by a proximity sensor and/or pressure sensors that is indicative of presence of an object at the gate 108. In another example, based on data from the torque sensor, the gate sensor data 132 may indicate that the moveable barrier encountered an obstruction while attempting to close. The gate data 128 may be indicative of when a user 118 entered the facility 102.

The scanner 110 at the gate 108, or elsewhere at the entry location 104, produces identification data 134. For example, if the scanner 110 comprises a camera, the identification data 134 may comprise image data that depicts at least a portion of a hand, a display of an electronic device, a pre-printed card, and so forth. In another example, if the scanner 110 comprises a near field communication (NFC) reader, the identification data 134 may comprise information obtained from an NFC tag presented by the user 118.

In other examples, as discussed further below, an I/O device may be included at the gate that includes a touch-based display and/or mechanical buttons. The I/O device may present group selection options to a user, receive user identifiers (e.g., user identification cards, credit cards, optical scans, etc.). For example, a user may select a group selection option indicating a quantity or range of individuals to be included in the group. Likewise, a user may present or provide an identifier that is used to determine an account to associate with the group. In still other examples, as discussed further below, the entry location may include a designated area at which individuals of a group gather for group determination and association.

Within the facility 102, one or more cameras 112 may have fields of view that include at least a portion of the entry location 104 and generate image data 136. For example, cameras 112 may be arranged to acquire images from overhead and/or at an oblique angle. Image data 136 may be obtained from other locations throughout the facility 102. In some implementations cameras 112 may be arranged around an exterior of the facility 102. For example, cameras 112 may be arranged to acquire image data 136 of users 118 as they approach the entry location 104, in the parking lot, and so forth. In some implementations, the image data 136 may be used to determine an entry time of the user 118 to the facility 102.

A gesture analysis module 138 accesses image data 136 to determine scan gesture data 140. For example, the image data 136 obtained from a camera 112 that is above the scanner 110 may be processed and used to determine the path of a hand of the user 118 while at the gate 108. A scan gesture may comprise presence of a hand or object at a particular time with respect to the scanner 110, one or more movements or series of movements performed by the user 118 that is indicative of the production of identification data 134 from the scanner 110, and so forth. For example, the scan gesture may comprise presence of a user's hand over the scanner 110 at a particular time. In another example, the scan gesture may comprise the user 118 moving a smartphone along a path that passes the smartphone over the scanner 110. In yet another example, the scan gesture may comprise the user 118 moving their hand over the scanner 110. The particular motions involved in the scan gesture may be based at least in part on the type of scanner 110 that is being used. For example, if the scanner 110 is obtaining an image of at least a portion of the user's 118 hand for subsequent biometric analysis, the scan gesture may include the overall movement towards the scanner 110 with a brief pause or minimum amount of dwell time over the scanner 110 followed by movement of the hand away from the scanner 110. The gesture analysis module 138 may utilize one or more artificial neural networks, classifiers, or other techniques to determine if the image data 136 is representative of a scan gesture or not. In some implementations the scan gesture data 140 may comprise data that is indicative of whether a scan gesture was made at a particular time.

A user location module 142 may us one or more of the image data 136 or data from other sensors during operation. The user location module 142 may assign a user identifier 144 to each user 118 in the facility 102 and generate user location data 146 that is indicative of a location within the facility 102 at particular times. For example, the user location module 142 may process the image data 136 obtained by the cameras 112 at known locations and with known fields of view to determine a location of an object present in the images that is determined to be the user 118. In other implementations, other techniques may be used for determining the user location data 146.

The user location module 142 or another module may associate a user identifier 144 with each user 118. The user identifiers 144 distinguish one user 118 in the facility 102 at that time from another user 118, and are not necessarily indicative of a definitive unique identity. For example, the user identifiers 144 may be serial numbers that are assigned in sequential order, regardless of the actual identity of the user 118 they represent. In some implementations, the identification data 134 presented at the gate 108 may be used to authenticate and affirmatively identify a particular user 118. For example, if the scanner 110 acquires an image of at least a portion of the user's 118 hand to perform biometric identification, the user identifier 144 subsequently assigned to that user 118 may be associated with that particular identity. As another example, if the user presents an identifier, such as a credit card, unique identifier on their smartphone, etc., the identifier may be used to identify the user.

In some implementations, the user location module 142 or another module may determine height data 148 of the user 118. For example, the image data 136 may be processed to determine a height of the user 118 as they pass through the gate 108 or elsewhere within the facility 102. In some implementations, the cameras 112 may include a depth channel that is able to provide information indicative of a distance between the camera 112 and an object in the camera's 112 field of view. For example, the camera 112 may comprise a range camera that is included or associated with a structured light system, time-of-flight system, coded aperture, and so forth that is able to provide image and depth or distance information for pixels within the image. Based on this information, height data 148 of the user 118 may be obtained. In other implementations other techniques may be used. For example, the gate 108 may include a vertically arranged optical curtain, such that interruption of one or more beams of the curtain provide information as to a maximum height of an object passing through the gate 108. The height data 148 may be associated with a particular user identifier 144.

A user behavior module 152 generates user behavior data 154 that is indicative of interactions between two or more users 118 within the facility 102. The user behavior module 152 may use data such as the image data 136, the user location data 146, and so forth during operation. For example, the user behavior module 152 may receive data from another module that processes image data 136 and generates information indicative of whether users 118 are picking up or placing items 116 to inventory locations 114, placing or retrieving items 116 from a single cart 120, passing objects between one another, and so forth. Continuing the example, the user behavior data 154 may be indicative of user 118(1) handing an object, such as an item 116, to the user 118(2). In another example, the user behavior data 154 may indicate that two users 118 are within a threshold distance of one another and the duration of that proximity. In yet another example, the user behavior data 154 may indicate a count of a number of times that one user 118(1) is within a threshold distance and is facing another user 118(2).

The exit location 106 may include one or more of gates 108, cameras 112, and so forth. As a user 118 leaves the facility 102, additional gate data 128, image data 136, or other sensor data may be obtained. This data may be used to determine an exit time of the user 118, that is indicative of when the user 118 is deemed to have left the facility 102. For example, the gate data 128 may indicate a time at which the gate 108 was opened to allow a user 118 to pass, and a gate identifier indicative of that particular gate 108.

A group analysis module 156 may use the data from one or more of the above modules, and in some implementations historical data 158, to determine group data 160. The group data 160 comprises information that may indicate whether one user identifier 144 is associated in a group with another user identifier 144, designate an account associated with a user, and so forth. For example, the group analysis module 156 may determine group data 160 that indicates user 118(3) is associated with the account of user 118(2). In some implementations, the group analysis module 156 may determine group data 160 each time a group of two or more individuals are detected entering a facility.

The group analysis module 156 may receive data indicative of a group entering at a first gate 108(1) at a first time. For example, a determination may be made that user 118(2) and user 118(3) are present at the first gate 108(1) within a threshold time of the first time. For example, based on one or more of gate data 128 and/or user location data 146, the group analysis module 156 may determine that user 118(2) and user 118(3) are at the gate 108(1) within the same two-second interval.

The gate data 128 may indicate that users 118(1), 118(2), and 118(4) presented identification data 134 at the gate 108(1). As described above, the user location module 142 may assign unique user identifiers 144 to the users 118(1)-(4). In this example, no identification data 134 was provided by the user 118(3). Entry times are also determined and associated with each of the users 118. For example, the entry times may be based on gate sensor data 132, image data 136, and so forth.

The group analysis module 156 attempts to determine whether a user 118 is to be included as part of a group or if the user is alone when entering the facility. This determination may involve partitioning those users 118 entering the facility 102 into groups. For example, a user 118 who presents identification data 134 and is separated by more than the threshold time from a preceding user 118 and a following user 118, may be deemed to be entering the facility 102 by themselves, or "solo." However, a user 118 who enters without associated identification data 134 may be at least tentatively designated as belonging to a group. As another example, if a user indicates that a group is entering that will use that user's account, it may be determined that the individuals entering the facility during that time are to be included in a group.

An initial partitioning may be based at least in part on the sequential or subsequent presentation of identification data 134 that differs. For example, users 118(1) and 118(2) provide different identification data 134, which may be deemed to partition the two and not include those individuals in the same group. In another example, if each of users 118(1) and 118(3) present identification data 134 that is different from the user 118 immediately in front or behind, the group analysis module 156 may determine users 118(1) and 118(3) as being solo users 118, and not part of a group.

The initial partitioning may be based at least in part on a difference in entry times exceeding a threshold value. For example, users 118 who enter more than 10 minutes apart may be deemed to be solo unless explicitly associated or indicated to be part of a group. Such an explicit association may be that the later user 118 presents identification data 134 that is associated with an earlier user 118 who is still within the facility 102.

The initial partitioning may be used by the group analysis module 156 to reduce the amount of data being processed to determine the group data 160. For example, the initial partitioning may be used to determine a possible or candidate group comprising those users within an initial partition. For example, the users 118(2), 118(3), and 118(4) may be part of a candidate group. The group analysis module 156 may use additional data as described herein to further determine the group data 160 indicating individuals that are entering the facility as part of a group.

A session comprises the time that a user 118 is at the facility 102. For example, the session may extend from the entry time until the exit time of that user's 118 visit to the facility 102. During a visit, the group analysis module 156 may generate a session score that is indicative of whether the user 118 is likely to be by themselves or part of a group. If the score is indicative of the user possibly being a member of a group, the group analysis module 156 may proceed to determine which user identifiers 144 are associated, or which account a particular user is associated with. For example, if the user 118(3) enters without identification data 134, the scan gesture data 140 indicates no scan gesture is made, and the user 118(3) entered within the threshold time of another user 118, the session score may be high, indicating possible group membership. Further information, such as the user behavior data 154 may increase or decrease the score. The session score is discussed in more detail below.

The group analysis module 156 may use other information, such as the gate data 128 obtained at exit of the users 118, user behavior data 154, and so forth to determine the group data 160. For example, if the gate data 128 indicates that users 118(2) and 118(3) entered within the threshold time of one another and then these users left the facility 102 within the threshold time of one another, the group analysis module 156 may determine group data 160 indicating that user 118(3) is associated with user 118(2). In another example, the user behavior data 154 indicating that the two users 118(2) and 118(3) remained near one another while in the facility 102, placed items 116 into a single cart 120, and so forth may also be used to determine the group data 160.

In some implementations, historical data 158 may be used by the group analysis module 156. For example, if a user 118 is affirmatively identified, their previous usage may be accessed and used to determine if this is an expected behavior. Continuing the example, the user 118(2) provides identification data 134 that affirmatively identifies user 118(2) as "Alice Nelson." The user 118(3) who entered immediately after Alice did not make a scan gesture, and no identification data 134 was obtained with the passage of user 118(3). This entry anomaly may result in user 118(3) being assessed as being a member of a group, but a determination needs to be made as to whether the user 118(3) is associated with user 118(2) (Alice) or user 118(4). The historical data 158 indicates that user 118(2) "Alice" has a probability of 0.7 of bringing a guest to the facility 102 during this time of day and day of the week, while user 118(4) has a probability of 0.1 of bringing a guest. In some implementations the historical data 158 may indicate that a particular account is associated with having guests in the facility. For example, the historical data 158 may indicate that the account associated with user 118(2) has a probability of 0.7 of bringing a guest to the facility 102. Based at least in part on this information, the group analysis module 156 may determine that user 118(3) is associated with user 118(2), and not user 118(4).

The group analysis module 156 is not limited to determining the group data 160 at the time of entry. The group analysis module 156 may assess data for the entire session of users 118 while in the facility. As a result, the group data 160 may be determined after exit of one or more users 118 from the facility 102. This post-exit binding allows for subsequent processes such as a billing module to more accurately associate the charges for interactions with items 116 to a particular user account. The group data 160 may include data indicative of a confidence value. For example, a high confidence value may indicate a strong likelihood that two or more users 118 are associated with one another. Continuing the example, if the group data 160 based on the data obtained during the sessions of users 118(2) and 118(3) indicates that they are associated with one another with a confidence value that is greater than a threshold, the two users 118 may be associated as members of a single group. As a result, if Alice's guest, user 118(3) picks an item 116 from the inventory location 114 and removes it from the facility 102, Alice's account will be billed for the cost of the item 116.

In some implementations, the group data 160 may be subject to confirmation by a human or other system. For example, based on the group data 160 exceeding a threshold confidence level, a message may be sent to the user 118(2) confirming whether they brought a guest to the facility 102 at a particular day and time. Once confirmed, the group data 160 associated with the user 118(2) and 118(3) may be affirmed and subsequently used for billing or other purposes.

Information obtained from one or more users 118 may also be used to generate the group data 160. For example, the user 118 may use an application on their smartphone and/or interact with an I/O device at the entry location to input the number or quantity of guests they will be bringing to the facility 102, or that they have brought to the facility 102. Based at least in part on this information, the group analysis module 156 may generate the group data 160.

A facility management module 162 may provide various functions associated with operation of the facility 102. The facility management module 162 may maintain information about inventory levels of items 116, determine when to restock items 116, direct robots to restock, bill user accounts for interactions by users 118 such as picks or places of items 116, and so forth. For example, the facility management module 162 may use sensor data such as the image data 136 to determine that the user 118(3) has picked item 116 (1) from inventory location 114 (7). Based on the group data 160, the facility management module 162 may bill the account of the user 118(2) for the item 116 (1) picked by the user 118(3).

Figure 2:
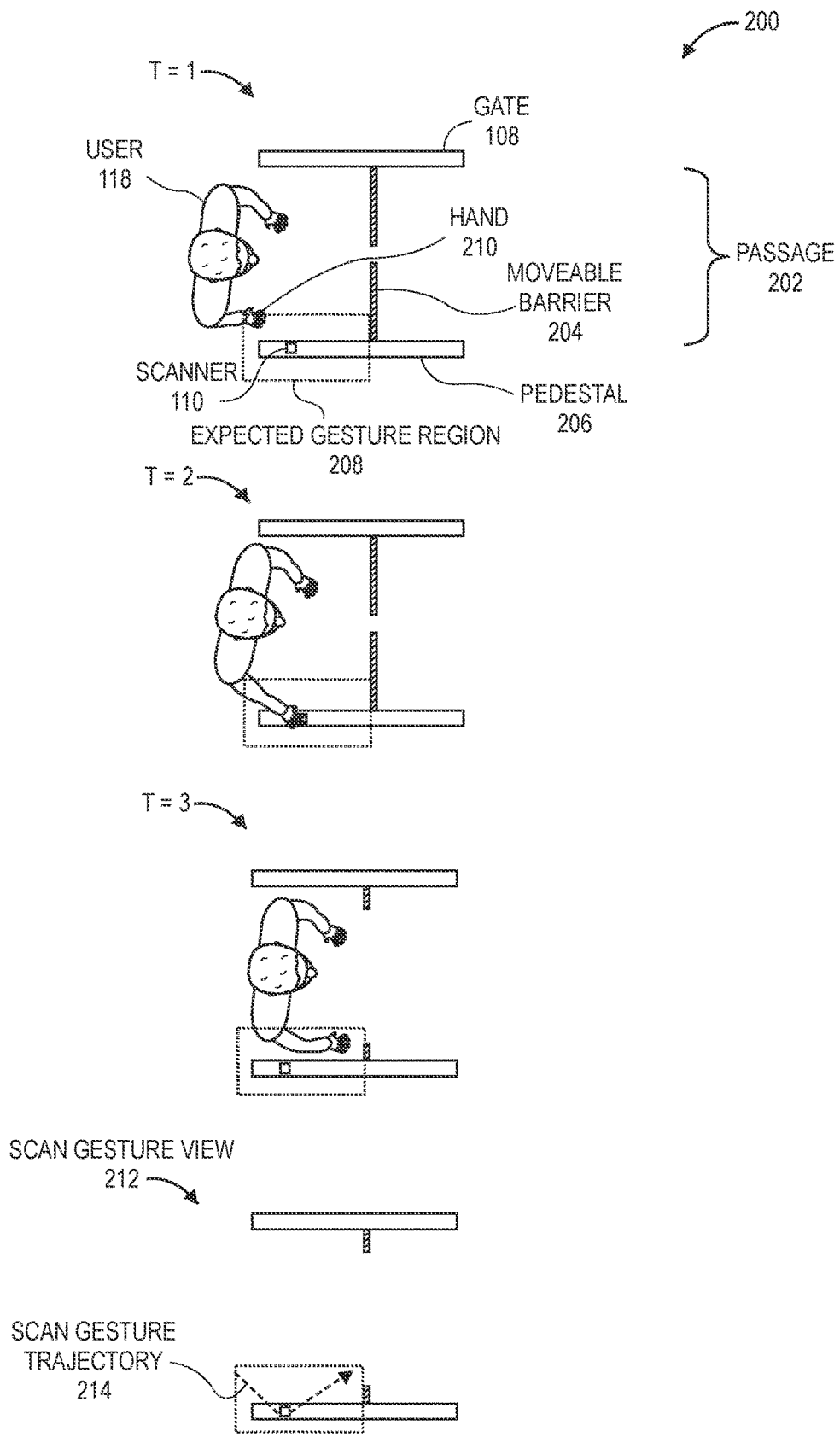
FIG. 2 illustrates a scan gesture provided at a gate, in accordance with implementations of the present disclosure.

FIG. 2 illustrates a scenario 200 in which the user 118 makes a scan gesture a gate 108, according to some implementations.

As described above, the gate 108 may provide a passage 202 with one or more moveable barriers 204. By opening the one or more moveable barriers 204, the gate 108 may allow the user 118 to proceed through the passage 202. By closing the one or more moveable barriers 204, the gate 108 may prevent the user 118 from proceeding through the passage 202.

The one or more moveable barriers 204 may be supported by one or more pedestals 206. For example, a left pedestal 206 forms a left edge of the passage 202 while a right pedestal 206 forms a right edge of the passage 202. The gate 108 may include one or more scanners 110. In this illustration, a scanner 110 is located in a right pedestal 206. An expected gesture region 208 is designated. The expected gesture region 208 specifies a region that is proximate to the scanner 110. The expected gesture region 208 may comprise an area within an image or a volume within three-dimensional space within which a scan gesture is expected to be made. For example, the illustrated expected gesture region 208 comprises a rectangular area that includes the scanner 110 and a portion of the right pedestal 206 before the moveable barrier 204.

The gesture analysis module 138 may use data from one or more sensors to determine if a hand 210 of the user 118 is making a scan gesture. The sensors may include one or more cameras 112 mounted overhead, a camera 112 or other sensor in the scanner 110, and so forth. For example, a plurality of images may be obtained using the one or more cameras 112. These images may be processed to determine the presence of a hand, and a motion of the hand as depicted in the images.

In the scenario depicted here, the user 118 approaches the gate 108 at time t=1 and begins moving their right hand 210, entering a first end of the expected gesture region 208 as they prepare to pass their hand 210 over the scanner 110. At time t=2 the right hand 210 is over the scanner 110 while at time t=3 the hand proceeds to exit a second end of the expected gesture region 208.

A scan gesture view 212 depicts a scan gesture trajectory 214 that is indicative of the movement of the hand 210 of the user 118 within the expected gesture region 208. The scan gesture trajectory 214 may be processed using one or more techniques to determine scan gesture data 140 that is indicative of whether a scan is deemed to have taken place. In one implementation, any motion within the expected gesture region 208 may be deemed to be a scan gesture. In another implementation, the image data 136 of the expected gesture region 208 may be processed to determine the location of the user's hand 210 at successive times, which may be processed by a neural network to determine if the scan gesture trajectory 214 as observed is likely to be a scan gesture.

Figure 3:
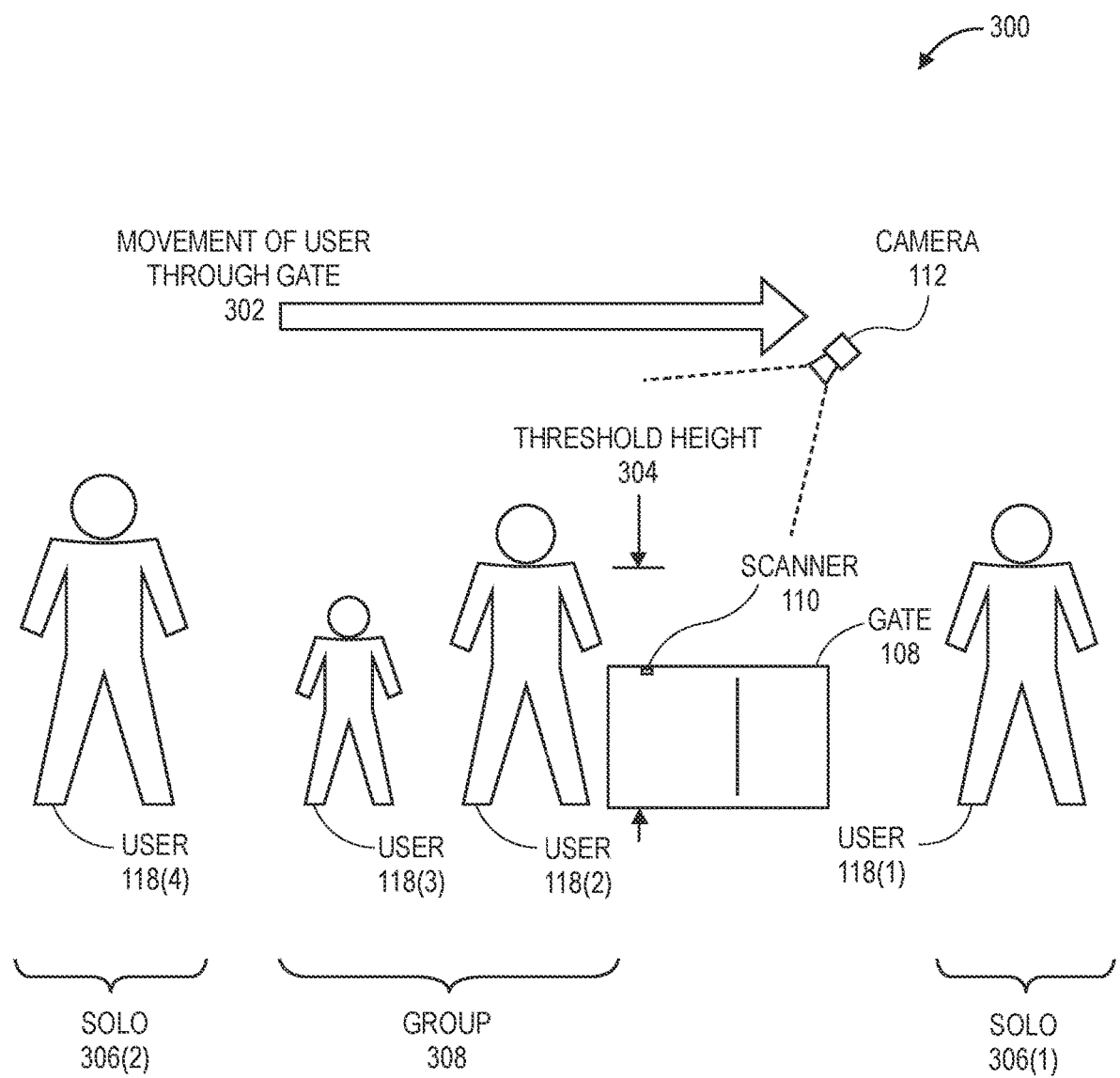

FIG. 3 illustrates a scenario 300 in which users 118 are passing through a gate 108 and their respective group associations, according to some implementations.

Group affiliation is indicated here for illustrative purposes. As described above, in some situations the group data 160 may not be determined until after one or more users 118 exit the facility 102.

In this illustration movement 302 of the users through the gate is depicted as left to right. The users 118 are queued up to pass through the gate 108. A threshold height 304 is designated. As descried above, sensors such as one or more cameras 112 may determine height data 148 of the users 118. If the height data 148 is indicative of a user 118 having a height that is below the threshold height 304, this may be a factor that is used to determine group membership, as described below.

User 118(1) has passed through the gate 108 and is designated as a solo 306 (1) user. Users 118(2) and 118(3) are a group 308. User 118(4) is a solo 306 (2) user. Users 118(1), 118(2), and 118(4) are taller than the threshold height 304. The height of user 118(3) is below the threshold height 304. In such an example, the height of the user may be utilized as a factor in determining if two or more individuals should be included in a group. For example, if the user 118(2) is known to have a child and users 118(2) and 118(3) entering within a defined threshold time of one another, those factors may be considered in determining that users 118(2) and 118(3) are to be included in a group.

Figure 4A:
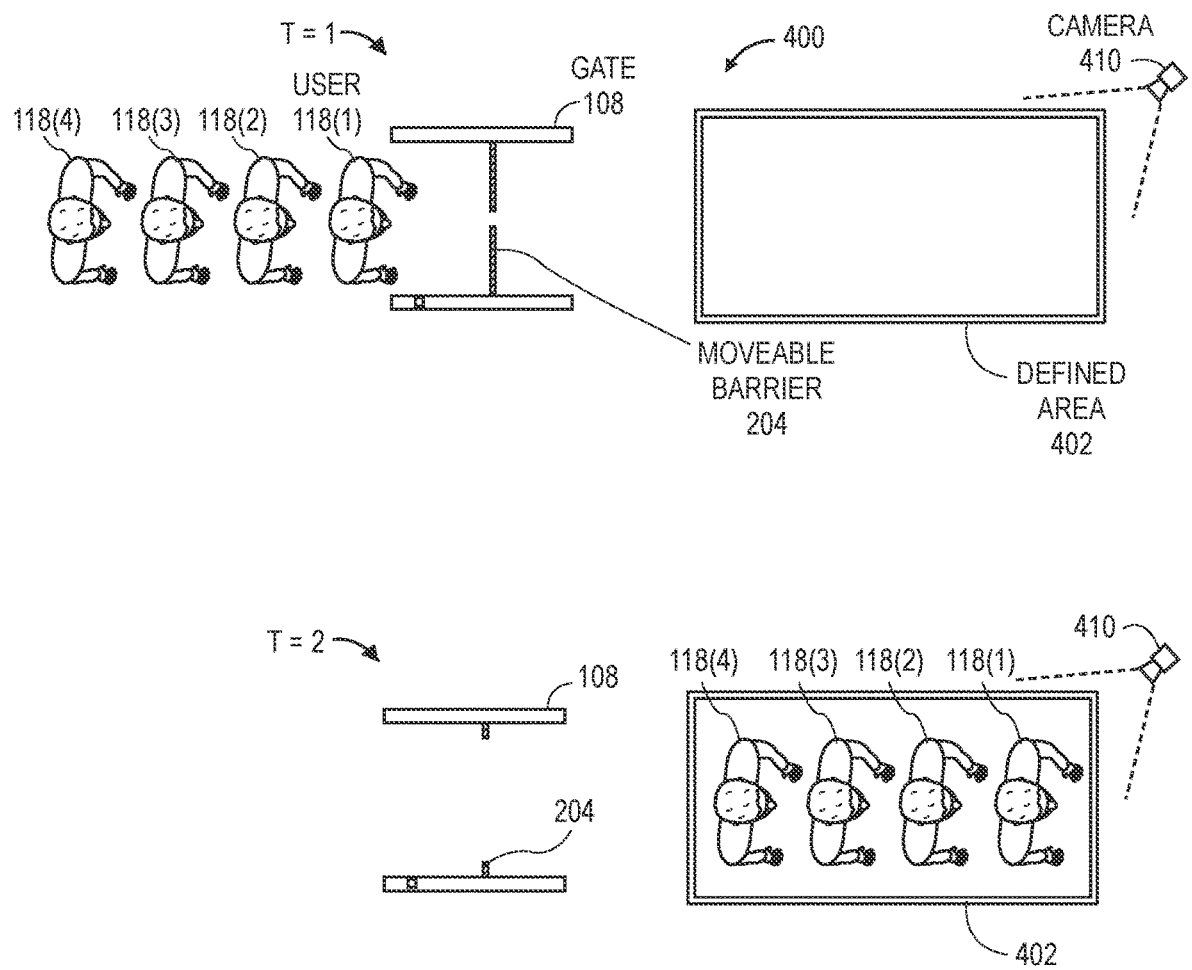

FIG. 4A illustrates another example scenario 400 of individuals passing through a gate 108 and respective group determination, in accordance with described implementations.

In this example, the facility includes a defined area 402 at which individuals that desire to be included in a group are to gather for group designation. For example, one of the individuals, such as user 118(1) may specify or otherwise indicate that a group is entering the facility and passing through the gate 108. In other examples, the disclosed implementations may present information at the gate 108 instructing individuals that desire to be included in a group to stand in the defined area 402. The defined area 402 may be a physically constrained area with walls, partitions, etc. In other examples, the defined area may be an area indicated on a floor of the facility (e.g., a rectangle painted on the floor of the facility).

In this example, at time t=2, the movable barrier 204 has opened and each of the individuals 118(1), 118(2), 118(3), and 118(4) have passed through the gate 108 and into the defined area 402. In this example, a camera 410 oriented toward the defined area 402 may generate image data that is processed to determine the number or quantity of individuals to include in the group. In this example, the processed image data indicates four individuals to include in the group. Processing of the image data generated by camera 410 may indicate the number or quantity of individuals but may not identify the actual individuals in the image. In some implementations, the image data may be used to determine identifiers, such as shape, clothing color, etc., that may be used to monitor positions of the individuals while in the facility. Likewise, user identifiers may be associated with each individual 118 and associated with the group determined for the individuals.

Still further, as discussed herein, an account, such as the account associated with user 118(1) may also be associated with the group. For example, during entry, user 118(1) may present an identifier or other credentials indicating that the account associated with user 118(1) is to be associated with the group.

Figure 4B:
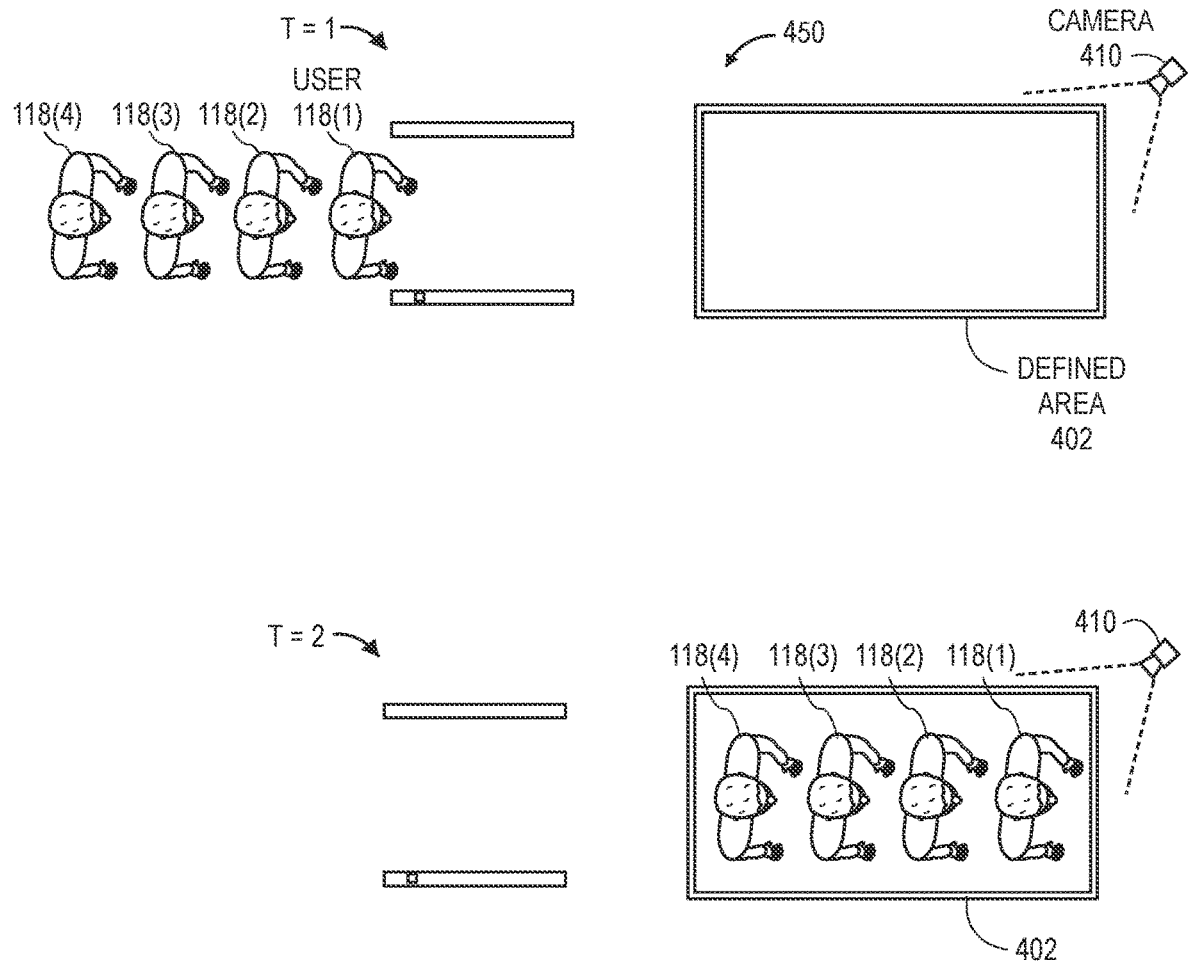

FIG. 4B illustrates another example scenario 450 of individuals passing through an entry location and respective group determination, in accordance with described implementations. In comparison to FIG. 4A, in FIG. 4B the gate is omitted from the example scenario 450.

In this example, the facility includes a defined area 402 at which individuals that desire to be included in a group are to gather for group designation. For example, one of the individuals, such as user 118(1) may specify or otherwise indicate that a group is entering the facility and at or passing through the entry location. In other examples, the disclosed implementations may present information at the location, such as on a display within the entry location, instructing individuals that desire to be included in a group to stand in the defined area 402. The defined area 402 may be a physically constrained area with walls, partitions, etc. In other examples, the defined area may be an area indicated on a floor of the facility (e.g., a rectangle painted on the floor of the facility).

In this example, at time t=2, the individuals 118(1), 118(2), 118(3), and 118(4) are at or have passed through entry location into the defined area 402 (the defined area 402 may be considered part of the entry location or separate from the entry location). In this example, a camera 410 oriented toward the defined area 402 may generate image data that is processed to determine the number or quantity of individuals to include in the group. In this example, the processed image data indicates four individuals to include in the group. Processing of the image data generated by camera 410 may indicate the number or quantity of individuals but may not identify the actual individuals in the image. In some implementations, the image data may be used to determine identifiers, such as shape, clothing color, etc., that may be used to monitor positions of the individuals while in the facility. Likewise, user identifiers may be associated with each individual 118 and associated with the group determined for the individuals.

Still further, as discussed herein, an account, such as the account associated with user 118(1) may also be associated with the group. For example, during entry, user 118(1) may present an identifier or other credentials indicating that the account associated with user 118(1) is to be associated with the group.

FIG. 5A illustrates another example scenario 500 of individuals passing through a gate 108 and respective group determination, in accordance with described implementations.

In this example, the defined area 402 is a confined area that includes the first gate 108(1), a second gate 108(2), and walls 550 that extend between the gates 108. In this example, at time t=1, the users 118(1), 118(2), 118(3), and 118(4) arrive at the first gate. One of the users may indicate that the users 118(1) through 118(4) are to be included in a group. In other examples, the movable barrier 204 of the gate may remain open until a defined period of time passes with no individuals passing through the gate, at which time to the movable barrier may close. For example, at time t=2, the movable barrier 204 is in the open position and users 118(1) through 118(4) have passed through the first gate 108(1) into the defined area 402. The camera 410 oriented toward the defined area 502 may generate image data that is processed to determine the number or quantity of individuals to include in the group. In this example, the processed image data indicates four individuals to include in the group. Processing of the image data generated by camera 510 may indicate the number or quantity of individuals but may not identify the actual individuals in the image. In some implementations, the image data may be used to determine identifiers, such as shape, clothing color, etc., that may be used to monitor positions of the individuals while in the facility. Likewise, unique identifiers may be associated with each individual 118 and associated with the group determined for the individuals.

Still further, as discussed herein, an account, such as the account associated with user 118(1) may also be associated with the group. For example, during entry, user 118(1) may present an identifier or other credentials indicating that the account associated with user 118(1) is to be associated with the group.

To assist in proper group determination, the second gate 108(2) may remain closed while the first gate 108(1) is open, thereby ensuring that individuals to be included in the group remain in the defined area until the group is determined. Referring now to FIG. 5B, at time t=3, it is determined that a defined period of time has elapsed with no individuals passing through the first gate 108(1) and, as a result of such determination, the movable barrier 204(1) moves to the closed position, as illustrated. In addition, image data from camera 510 may be generated and processed to determine the number or quantity of individuals positioned within the defined area 402, as discussed above.

Upon determination of the group, the movable barrier 204(2) of the second gate 108(2) is moved to the open position allowing the individuals 118(1), 118(2), 118(3), and 118(4) of the group to proceed into the facility. While the movable barrier 204(2) of the second gate 108(2) is open, the movable barrier 204(1) of the first gate 108(1) may remain in the closed position to separate individuals between groups.

Figure 6A:
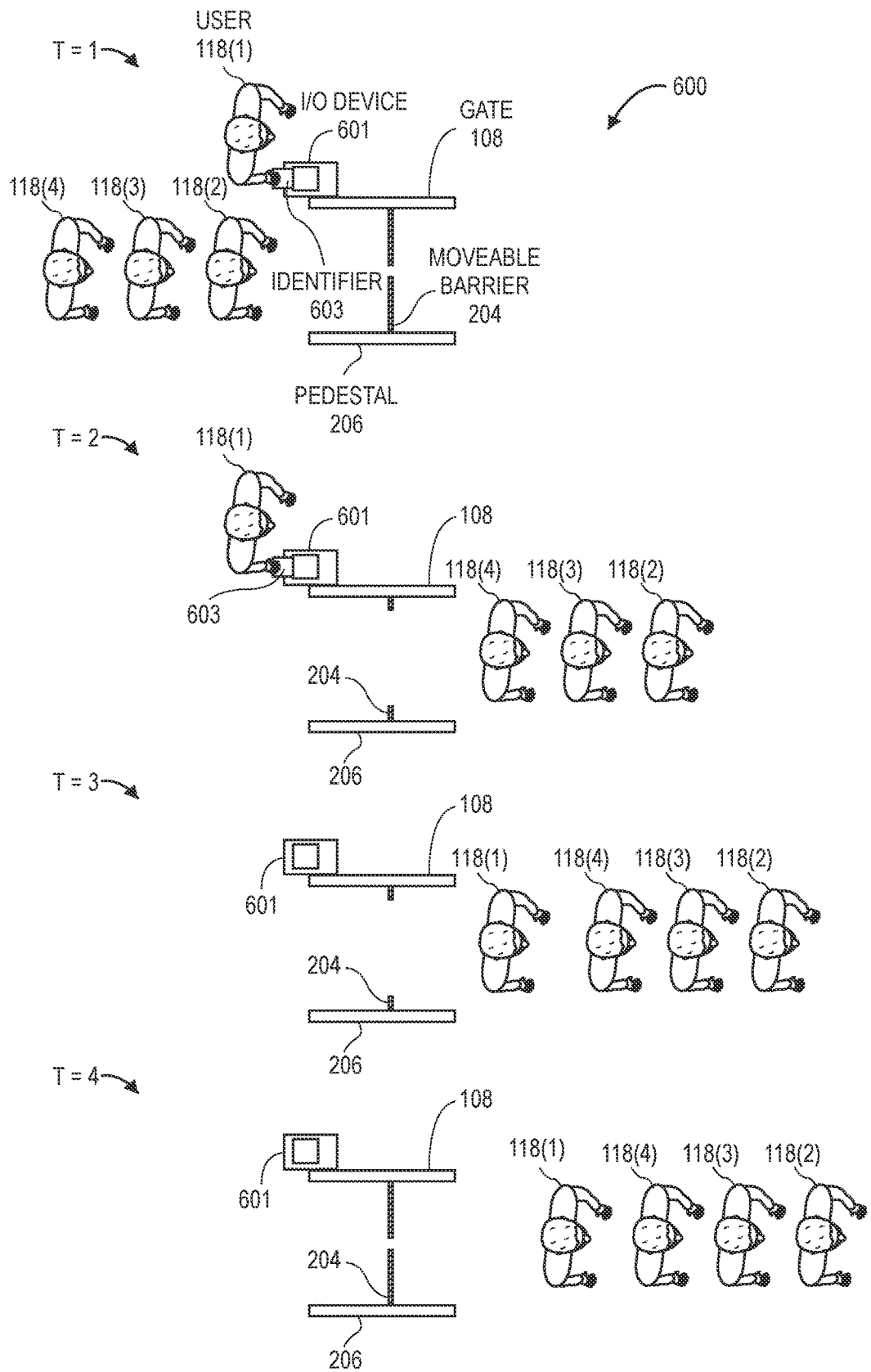

FIG. 6A illustrates yet another example scenario 600 of individuals passing through a gate 108 and respective group determination, in accordance with described implementations.

In this example, the gate 108 includes an I/O device 601 that may be interacted with by one or more users to indicate that a group is to be formed. For example, a first user 118(1) may insert an identifier 603, such as a user identifier, credit card, etc., into the I/O device 601 and/or interact with a touch-based display of the I/O device 601 to indicate both that a group is entering and an account to associate with the group. For example, as discussed further below, the I/O device 601 may include a touch-based display and/or physical buttons upon which group selection options are presented that may be selected by a user to indicate a group is entering. In other implementations, as illustrated in FIG. 6A, a group may be defined based on the actions of the individuals.

For example, the first user 118(1) may insert a card into the I/O device indicating a start time for group determination. While the card is inserted into the I/O device, the other individuals, users 118(2), 118(3), 118(4), may pass through the gate 108, as illustrated at time t=2. As the users 118 pass through the gate, one or more sensors at the entry location may count or determine the quantity of individuals passing through the gate.

Once all of the users that are to be included in the group have passed through the gate, the user 118(1) may remove the identifier 603, indicating a group determination stop time, and the user 118(1) may pass through the open gate 118(1). Upon detection of the first user removing the identification card 603 and passing through the gate 108, as illustrated at time t=3, the disclosed implementations close the moveable barrier 204 of the gate 108, as illustrated at time t=3, and define a group that includes individuals 118(1), 118(2), 118(3), and 118(4) and also associates an account of the first user 118(1) with the group. As discussed herein, actions performed by the individuals 118(1), 118(2), 118(3), 118(4) of the group while in the facility are associated with the group and any fees or costs from those actions may be applied to the account of the first user 118(1).

Figure 6B:
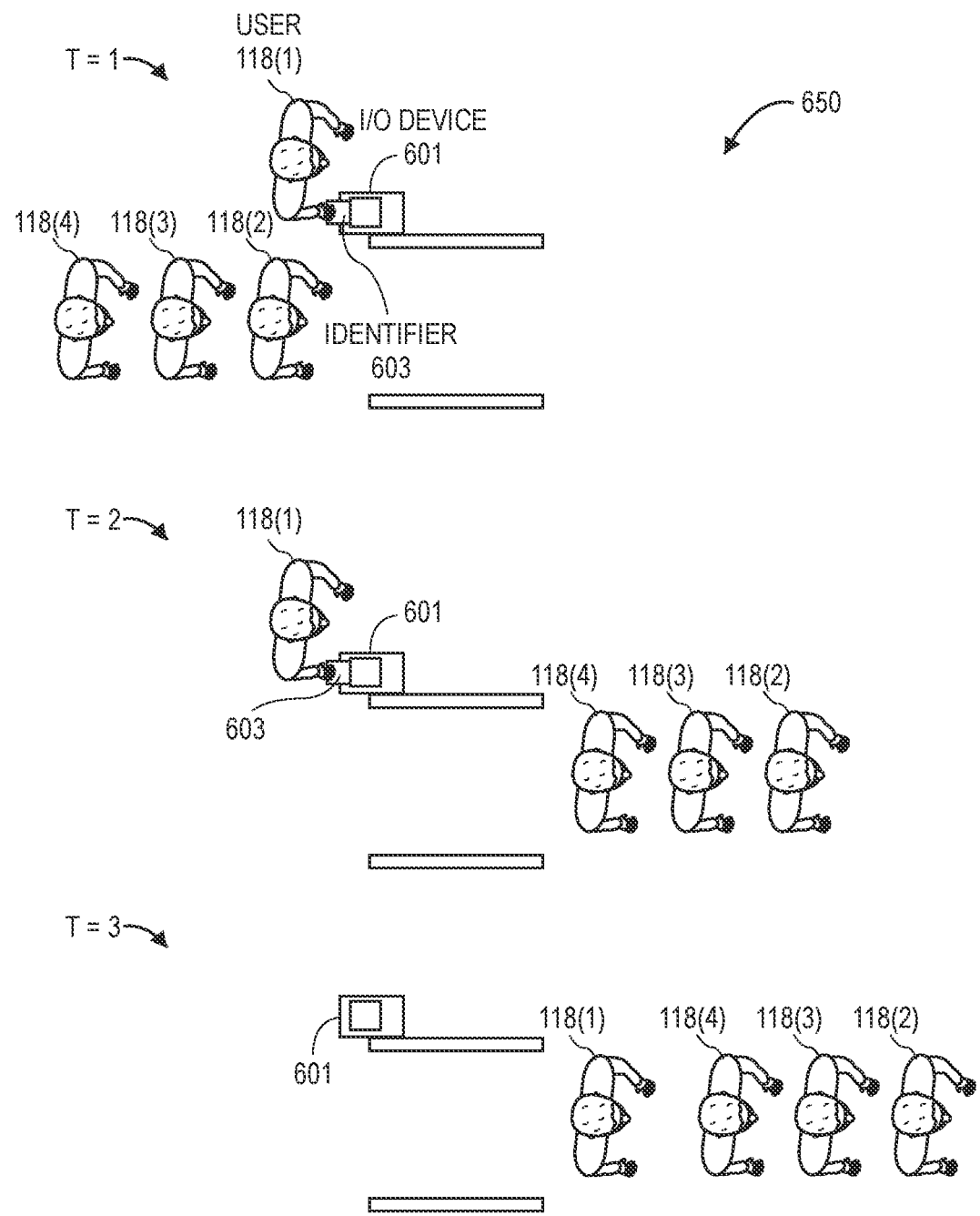

FIG. 6B illustrates yet another example scenario 650 of individuals passing through an entry location and respective group determination, in accordance with described implementations. In comparison to FIG. 6A, in FIG. 6B the gate is omitted from the example scenario 650.

In this example, an I/O device 601 is included that may be interacted with by one or more users to indicate that a group is to be formed. For example, a first user 118(1) may insert an identifier 603, such as a user identifier, credit card, etc., into the I/O device 601 and/or interact with a touch-based display of the I/O device 601 to indicate both that a group is entering and an account to associate with the group. For example, as discussed further below, the I/O device 601 may include a touch-based display and/or physical buttons upon which group selection options are presented that may be selected by a user to indicate a group is entering. In other implementations, as illustrated in FIG. 6B, a group may be defined based on the actions of the individuals.

For example, the first user 118(1) may insert a card into the I/O device indicating a start time for group determination. While the card is inserted into the I/O device, the other individuals, users 118(2), 118(3), 118(4), may enter or pass through the entry location, as illustrated at time t=2. As the users 118 enter or pass through the entry location, one or more sensors at the entry location may count or determine the quantity of individuals at or passing through the entry location.

Once all of the users that are to be included in the group are at or have passed through the entry location, the user 118(1) may remove the identifier 603, indicating a group determination stop time. Upon detection of the first user removing the identification card 603, as illustrated at time t=3, the disclosed implementations may define a group that includes individuals 118(1), 118(2), 118(3), and 118(4) and also associate an account of the first user 118(1) with the group. As discussed herein, actions performed by the individuals 118(1), 118(2), 118(3), 118(4) of the group while in the facility are associated with the group and any fees or costs from those actions may be applied to the account of the first user 118(1).

While the disclosed implementations discuss associating a single account with a group of individuals and applying fees or costs to that single account, in other implementations, multiple accounts may be associated with the group, activities of the group associated with those accounts, and any fees or costs applied in some percentage to each of those accounts. For example, a group of five individuals may be determined as entering a facility and it may further be determined that two accounts are to be associated with the group. Group actions by those five individuals while in the facility may be associated with both accounts and the fees or costs may be split equally between the two accounts associated with the group. In other implementations, any combination of accounts and fee/cost distribution may be associated with groups as discussed herein.

Figure 7:
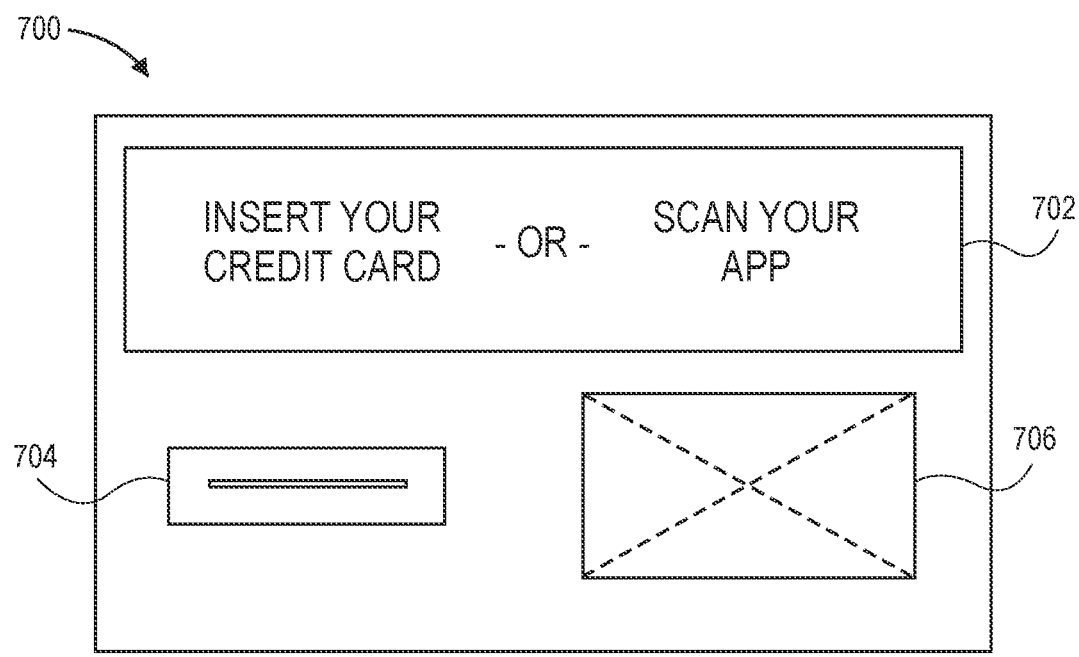
FIG. 7 is a block diagram of an input-output device at an entry location, in accordance with implementations of the present disclosure.

FIG. 7 is a block diagram of an I/O device 700 at an entry location, in accordance with described implementations.

In the illustrated example, the I/O device 700 includes a touch-based display 702, a card reader 704, such as a credit card or other identifier card reader, and a visual identifier reader 706, such as a bar code or QR code scanner. As discussed herein, the I/O device may be positioned at or near an entry location of a facility and allow interaction by users to indicate groups entering the facility, to provide an identifier of the user entering the facility, and/or to identify an account to associate with a group.

FIGS. 8A through 8D illustrate example user interfaces presented on a display of an I/O device 700 at an entry location, in accordance with described implementations.

Figure 8A:
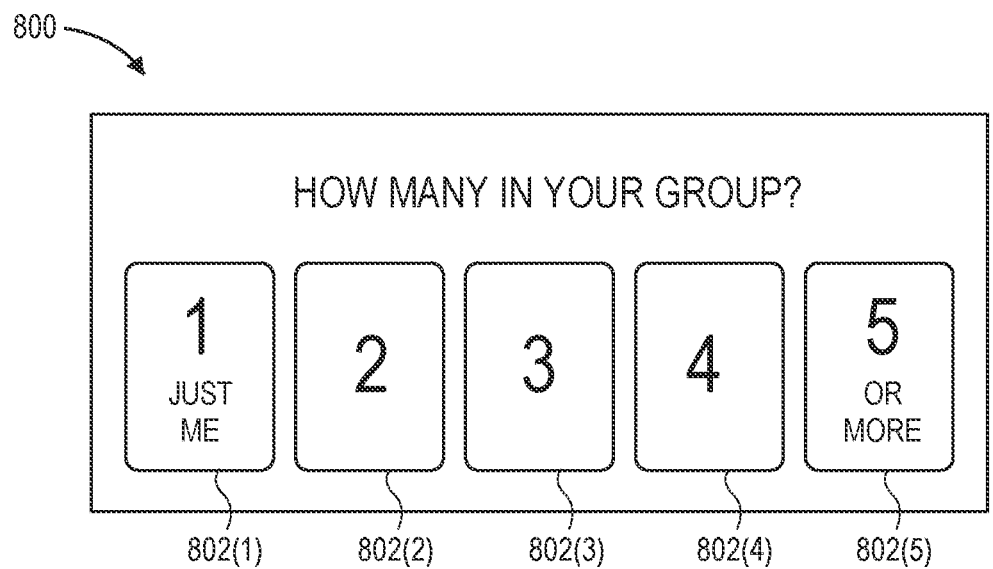
FIGS. 8A through 8D illustrate example user interfaces presented on a display of an input-output device at an entry location, in accordance with implementations of the present disclosure.

Referring first to FIG. 8A, the user interface 800, which may be presented on the touch-based display of the I/O device 700, includes group selection options 802(1), 802(2), 802(3), 802(4), 802(5) that may be selected by an individual to indicate a quantity of individuals to be included in a group. For example, if the user is alone, the user may select group selection option 802(1) for just one person, or solo. If the group is to include two individuals, the group selection option 802(2) may be selected. If the group is to include three individuals, the group selection option 802(3) may be selected. If the group is to include four individuals, the group selection option 802(4) may be selected. If the group is to include five or more individuals, the group selection option 802(5) may be selected.

As will be appreciated, fewer or additional group selectin options may be presented and selectable by a user and the five options presented in FIG. 8A are for explanation purposes only. Likewise, while the example group selection options discussed with respect to FIGS. 8A through 8D are described as presented on a touch-based display of an I/O device 700, in other implementations, the group selection options may be physical buttons included on the I/O device 700, a combination of physical buttons and touch-based presentation, or other form of I/O that enables a user to select a group selection option, as discussed herein.

As discussed further below, the disclosed implementations may utilize a user provided group selection option as another factor in determining groups and/or group quantities. For example, if a user selects group selection option 802(3) indicating three users to be included in the group, but the disclosed implementations only detect two actual users, the group may be defined to only include the two detected users. Likewise, in some implementations, if a difference between the indicated group quantity and the determined actual group quantity is determined, one or more users of the group may be notified for resolution. In other implementations, an agent may be utilized to resolve the difference and determine the correct group quantity and/or to indicate the individuals to include in the group.

Figure 8B:
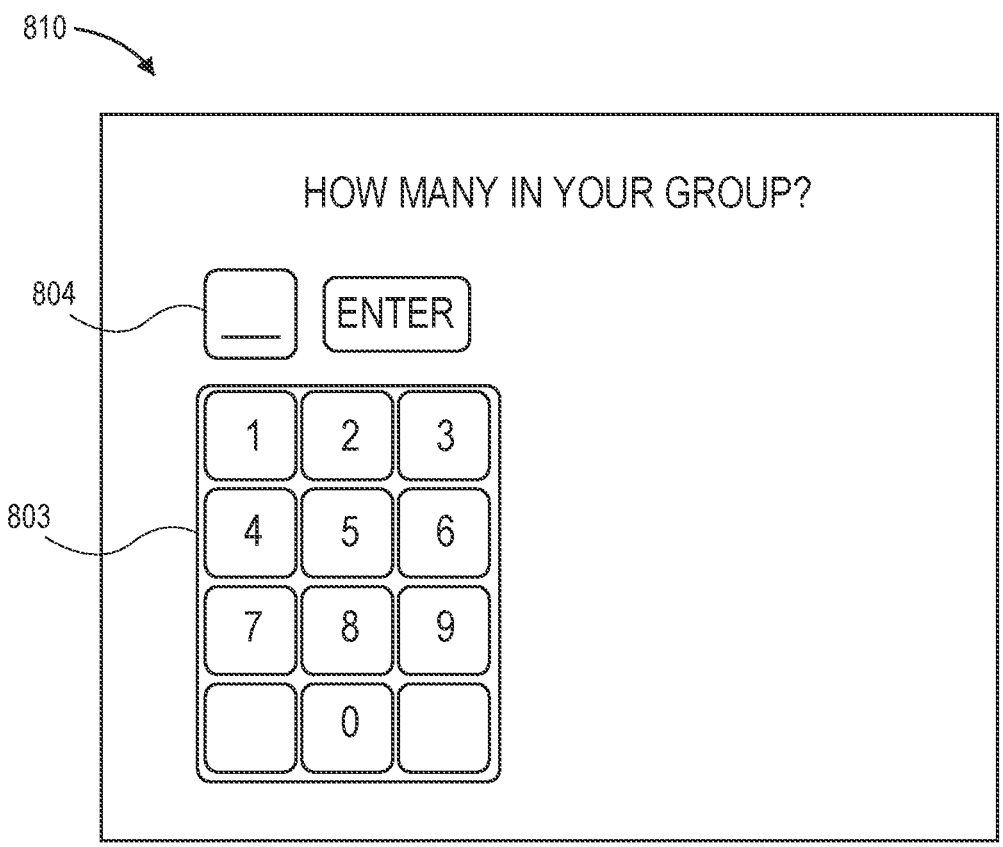

FIG. 8B illustrates a different user interface 810 that may be presented on a touch-based display of an I/O device, in accordance with described implementations. In this example, rather than selecting a group selection option, a user may key in or input using keys 802 the number 804 of individuals to include in a group.

Figure 8C:
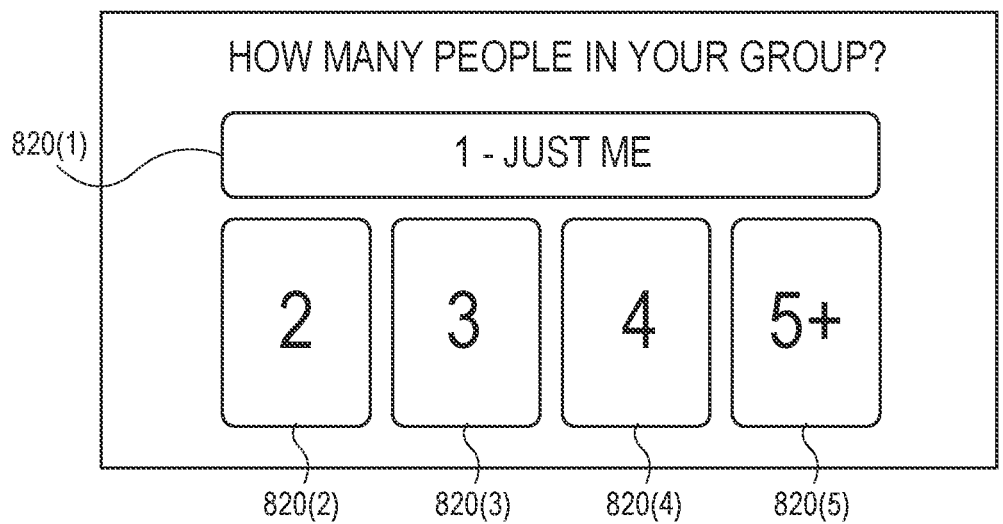

FIG. 8C illustrates another example user interface 820 that includes group selection options that may be presented by an I/O device, in accordance with described implementations.

The example user interface 820 illustrated in FIG. 8C is similar to that of the user interface 800 illustrated in FIG. 8A. However, as illustrated in FIG. 8C, the group selection option 820(1) to indicate that the user is alone, or solo, may be visually presented larger than the other group selection options 820(2), 820(3), 820(4), and 820(5). Such a visual difference may reduce the potential for a user to inadvertently select a group selection option for two or more individuals when the user is alone.

Figure 8D:
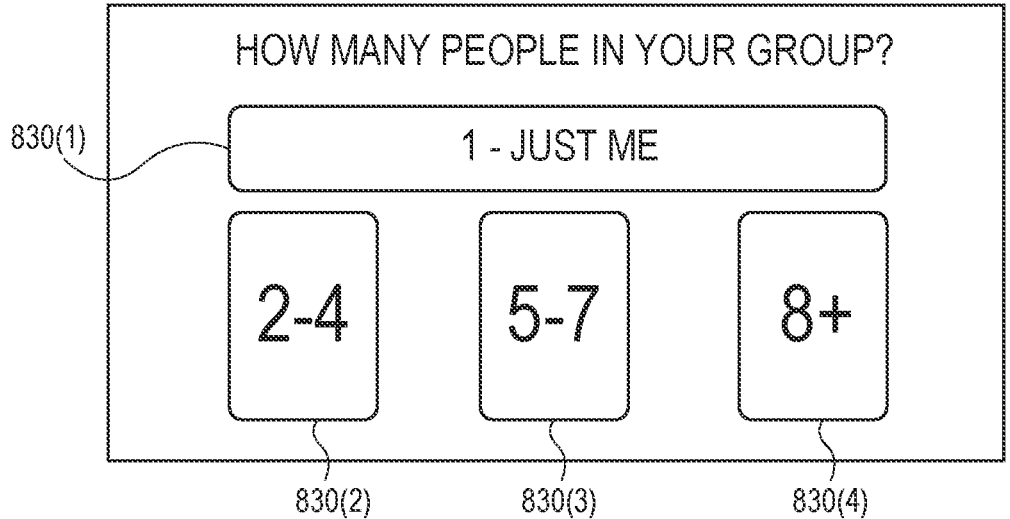

FIG. 8D illustrates another example user interface 830 that includes group selection options that may be presented by an I/O device, in accordance with described implementations.

As illustrated in FIG. 8D, in some implementations, the group selection options may present ranges of quantities of individuals to include in a group. For example, group selection option 830(2) corresponds to between two and four individuals to include in the group, group selection option 830(3) corresponds to between five and seven individuals to include in the group, and group selection option 830(4) corresponds to eight or more individual to include the group. Again, group selection option 830(1), which may be presented larger than the other group selection options 830(2) through 830(4), may allow for indication that the user is alone (i.e., solo).

Group selection options that indicate a range of individuals to include in a group, such as those illustrated in FIG. 8D may be preferred for larger groups and, as discussed, the selection used as a factor in determining the quantity of individuals to include in a group. For example, if a user selects group selection option 830(3), indicating between five and seven individuals, and the disclosed implementations process sensors data, such as image data, to determine there are six individuals in the group, those two factors may be utilized to generate a group that includes the determined six individuals. However, if the user selects group selection option 830(3) (between five and seven individuals) and the disclosed implementations determine there are nine individuals present, the user or an agent may be notified of the difference and a resolution determined before the group is established.

Figure 9:
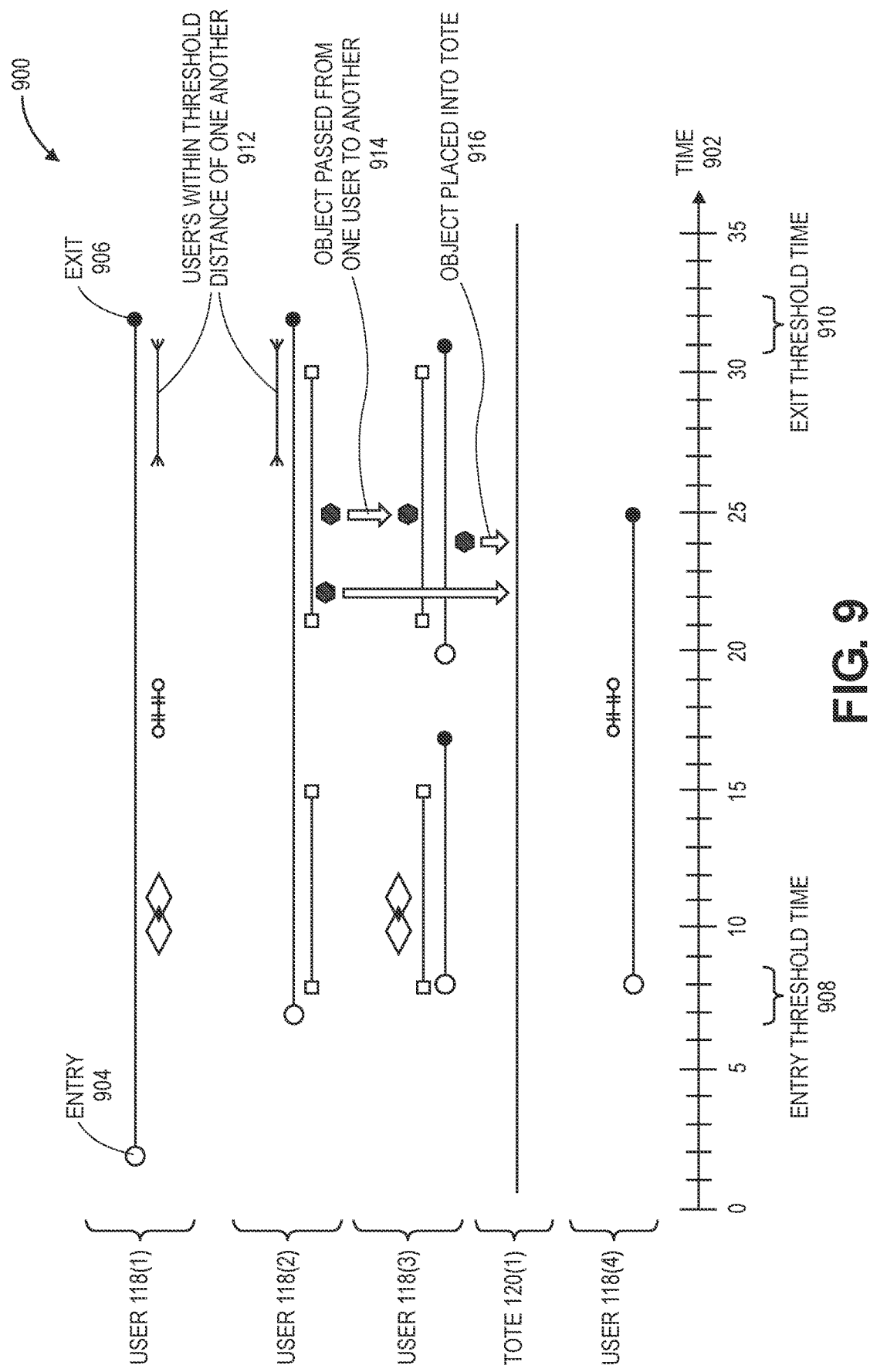
FIG. 9 is a graph illustrating entry and exit of users and some behaviors such as being near one another and passing an object from one user to another, in accordance with implementations of the present disclosure.

FIG. 9 is a graph 900 illustrating entry and exit of users 118 and some behaviors such as being near one another and passing an object from one user to another, according to some implementations. In this graph, time 902 is indicated along a horizontal axis, increasing left to right. Information associated with users 118(1)-(4) are depicted respectively at different positions along a vertical axis.

Entry 904 and exit 906 of each user 118 is shown. As depicted here, the user 118(1) enters at t=2 and exits at t=32. The user 118(2) enters at t=7 and exits at t=32. The user 118(3) enters at t=8, exits at t=17, re-enters at t=20 and exits at t=31. The user 118(4) enters at t=8 and exits at t=25. An entry threshold time 908 is depicted. For example, the entry threshold time 908 shown here is equal to two units of time. An exit threshold time 910 of two units of time is also shown. The group analysis module 156 may determine whether two or more entries 904 occurred during the entry threshold time 908. If two entries 904 occur within the entry threshold time 908, the users 118 associated with those entries 904 may be possible group members. The group analysis module 156 may determine whether two or more exits 906 occurred during the exit threshold time 910. If two exits 906 occur within the exit threshold time 910, the users 118 associated with those exits 906 may be possible group members.

As described above, the user behavior module 152 may determine user behavior data 154. In this illustration, user's 118 within a threshold distance 912 of one another are shown using additional matching indicia. For example, users 118(1) and 118(3) are within the threshold distance of one another from t=9 to t=12. User 118(1) is within the threshold distance to user 118(4) from t=17 to t=19. Users 118(2) and 118(3) are within the threshold distance from t=8 to t=15 and t=21 to t=30.

The user behavior module 152 may determine behaviors such as an object being passed from one user 118 to another user 118. For example, as shown here at 914 the user 118(2) passes an object to the user 118(3) at t=25. In one implementation, the image data 136 may be processed to make this determination. The object may comprise an item 116, or it may comprise some other object, such as a purse, toy, hat, and so forth that the user 118 brought into the facility 102 or otherwise acquired. Shown at 916 is the user 118(2) placing an object into the tote 120(1) at t=22 and the user 118(3) placing an object into the same tote 120(1) t=25. The object may comprise an item 116, or personal possession of the users 118.

The group analysis module 156 may use the user behavior data 154 and other information such as gate data 128 to determine whether two or more users 118 are members of a group 308. For example, if the time that two users 118 are within a threshold distance of one another 912 exceeds a threshold value, the likelihood that they are associated in a group 308 may be increased. Likewise, if a user 118 passes an object to another user 118, this may be indicative of an increased likelihood that the users 118 are associated and to be included in a group. By assessing these behaviors, the group analysis module 156 may generate group data 160 that indicates two or more users 118 are associated with one another in the same group.

Figure 10:
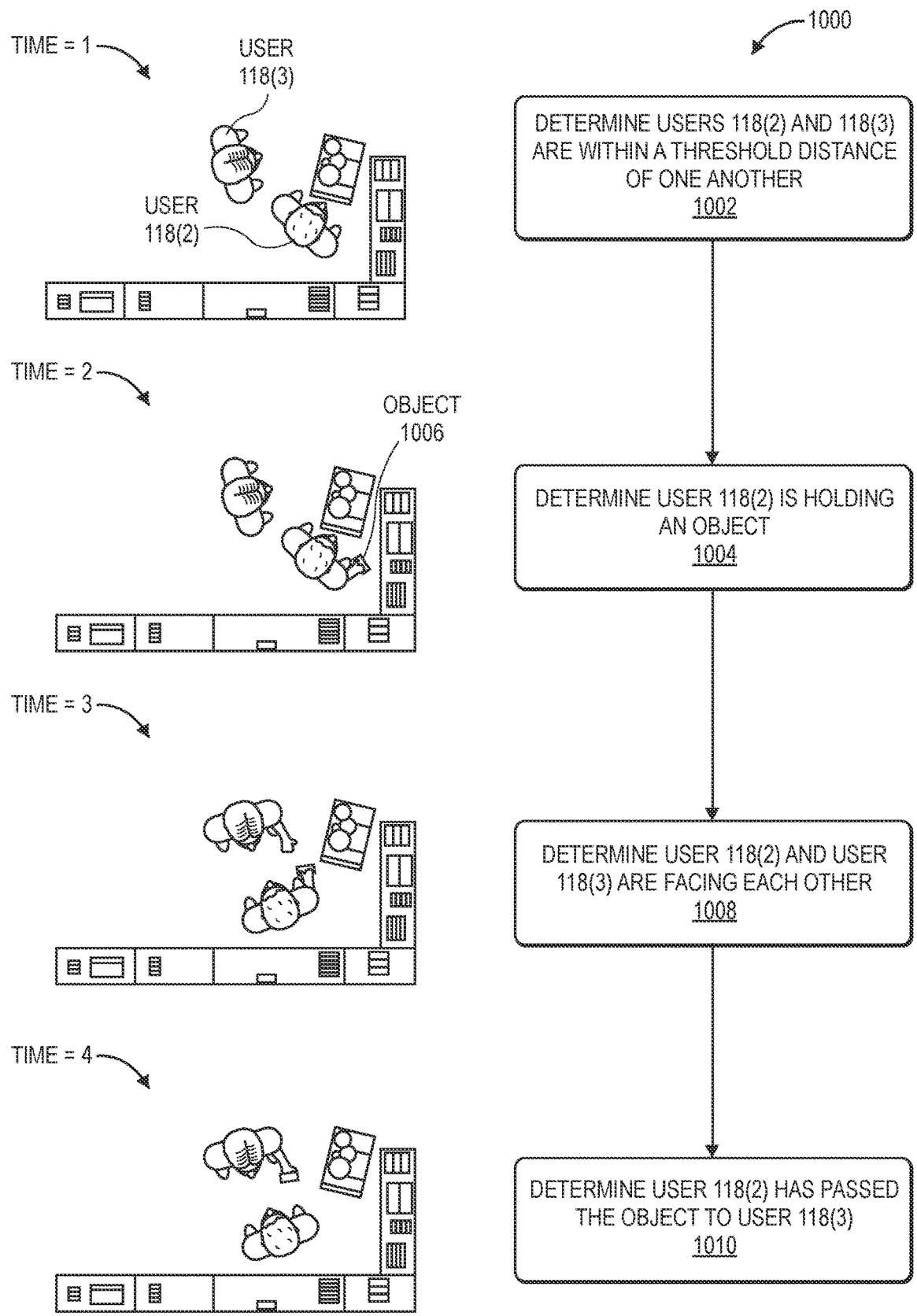
FIG. 10 illustrates a scenario of user behaviors that may be indicative of grouping, in accordance with implementations of the present disclosure.

FIG. 10 illustrates a scenario 1000 of user behaviors that may be indicative of grouping, according to some implementations. The behaviors may be determined at least in part by the user behavior module 152 and may be indicated in the user behavior data 154.

At 1002 a determination is made that the user 118(2) and 118(3) are within a threshold distance of one another 912. For example, the user behavior module 152 may use the user location data 146 provided by the user location module 142 to determine that the locations of the users 118 are within the threshold distance of one another 912.

At 1004 the user 118(2) is holding an object 1006. For example, the user 118(2) may have picked an item 116 from the nearby inventory location 114.

At 1008 the user 118(2) and the user 118(3) are facing each other within a threshold angle. For example, the overall orientation of the heads of the users 118 may be towards one another. In some implementations, the determination as to whether one user 118 is facing another may be based at least in part on position of one or more of their shoulders, feet, hands, and so forth.

At 1010 the user 118(2) is determined to have passed the object 1006 to the user 118(3). For example, the user 118(3) may now be holding the item 116 that was originally picked by the user 118(2).

FIG. 11 illustrates a table 1100 of various grouping conditions and values that may be used to determine a total session score for a session that is indicative of whether a user 118 is a member of a group 308, according to some implementations. While a table is illustrated, in other implementations the conditions and resulting values may be represented at least in part using executable code, script, or other data structures to store information. In one implementation, the group analysis module 156 may generate the total session score.

As described above, a session comprises the time that a user 118 is at the facility 102. For example, the session may extend from the entry time until the exit time of that user's 118 visit to the facility 102. Depicted are grouping conditions 1102 that may be used by the group analysis module 156 to determine if a user 118 may be associated with another user 118. Each condition may be associated with a particular value 1104, such as per occurrence. A count of occurrence 1106 of the grouping conditions 1102 during a session may be maintained. In other implementations, other metrics may be used, such as total duration. A session score 1108 may be determined for the grouping condition 1102 as a product of the value 1104 and the count of occurrences 1106. The session scores 1108 may be summed to produce a total session score 1110.

In this illustration, the greater the total session score 1110, the greater the likelihood that the user 118 is associated with another user 118 and that the two are to be associated with the same group. Likewise, the lower the total session score 1110, the lower the likelihood that the user 118 is part of a group 308. In this illustration, the scores associated with user 118(3) are shown. For example, the user 118(3) did not make a scan gesture, no identification data 134 is associated with this user 118(3), the user 118(3) is below the threshold height 304, and a total of seven objects 1006 were passed between the user 118(3) and another user. Continuing the example, the user 118(3) entered within the entry threshold time 908 of user 118(2) and exited within the exit threshold time 910 of user 118(2). As a result, the total session score 1110 in this illustration is 320. A total session score 1110 that exceeds a threshold value of 70 may be deemed a member of a group 308, while a score less than the threshold value may indicate a solo user 306. In other implementations, the threshold value may be higher or lower.

The set of grouping conditions 1102 shown are provided by way of illustration, and not necessarily as a limitation. It is understood that additional grouping conditions 1102 may be used, or that a subset of grouping conditions 1102 may be used to determine likelihood that a user 118 is a member of a group 308. For example, the grouping conditions 1102 may be used to determine total session scores 1110 for the users 118. Based on a comparison of the total session score 1110 to one or more thresholds, the group analysis module 156 may generate the group data 160. Likewise, the threshold score, may be any value and may be different for different users, different times of day, different days of weeks, etc.

In another implementation, a subset of the grouping conditions 1102 may be used to determine an entry score. For example, those grouping conditions 1102 that are associated with activity at the entry location 104 may be used to generate an entry score. For example, the grouping conditions 1102 associated with the entry location 104 may include the person being present at the gate 108 at a first entry time, whether the gate barrier 204 was open at the first entry time, whether a scan gesture was made, whether identification data 134 was obtained, whether users gathered together in a defined area of the entry location, whether a group selection option was selected at entry, and so forth. If the entry score exceeds a threshold value, the system may continue to assess the user 118 to determine if they are a member of a group 308.

As described above, the determination of whom the user 118 is associated with may be based on one or more of a correspondence of data with other users 118, user behavior data 154, historical data 158, and so forth. For example, grouping may be determined based on entry 904 and exit 906 times that occur within entry threshold times 908 and exit threshold times 910, respectively. However, additional information may be used to disambiguate between potential group membership. As described above, the user behavior data 154 such as passing objects 1006 or using a common cart 120 may be strong indicators of two or more users 118 being associated and/or included in the same group.

Figure 12:
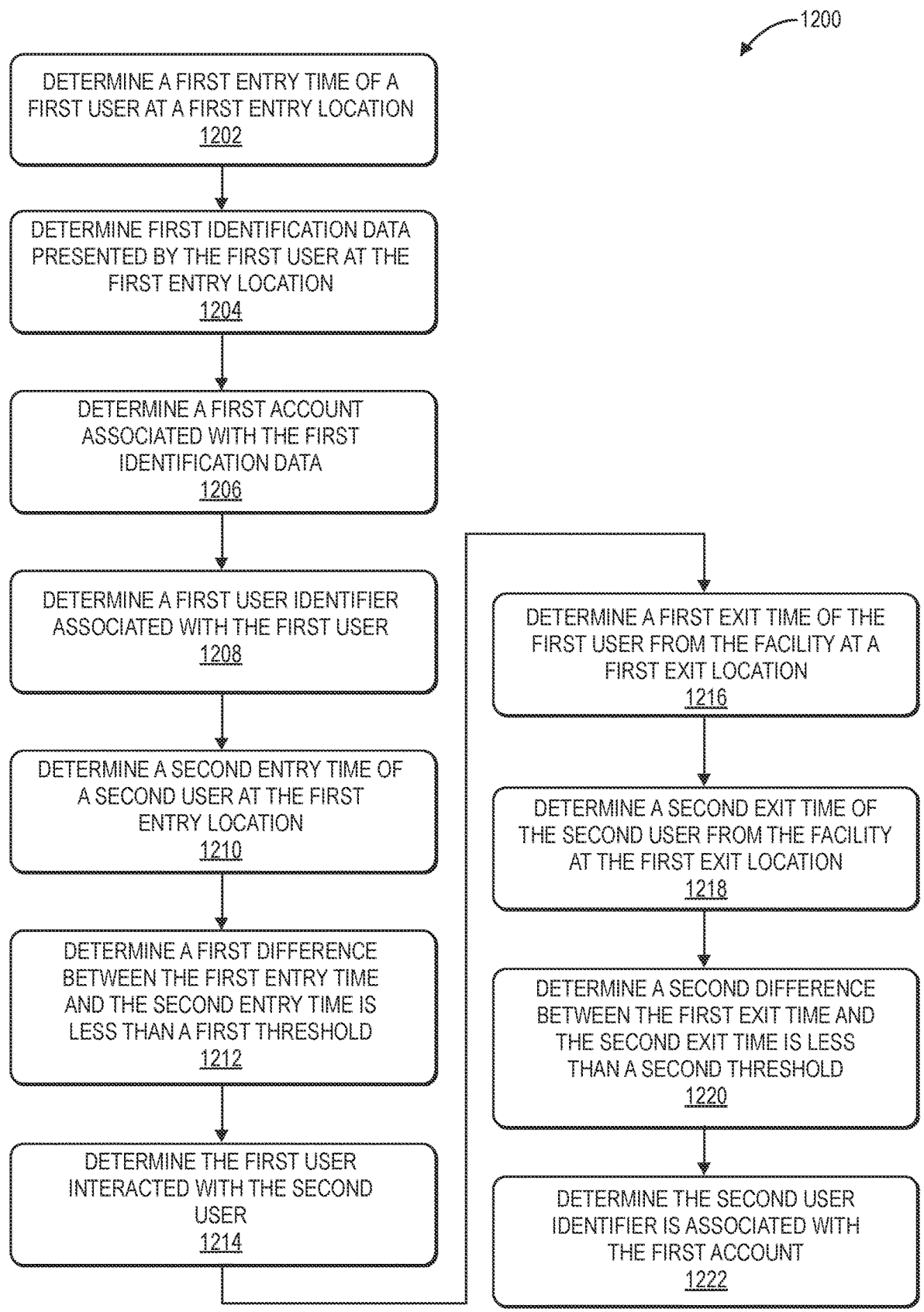
FIG. 12 illustrates a flow diagram of a process to determine a first user is associated with a second user, in accordance with implementations of the present disclosure.

FIG. 12 illustrates a flow diagram 1200 of a process to determine a first user is associated with a second user, according to some implementations. The process may be implemented at least in part by the system 100 described herein.

The example process 1200 begins by determining a first entry time of a first user 118 at a first entry location 104, as in 1202. For example, the first user 118 may be present at a first gate 108 at the first entry location 104. The first entry time may be determined based on one or more of the gate data 128, image data 136, and so forth. For example, the first entry time may be the time when the user 118 passed a particular threshold, such as the moveable barriers 204.

First identification data 134 presented by the first user 118 at the first entry location 104 may also be determined, as in 1204. For example, the scanner 110 may comprise a first camera 112 that generates image data 136. The image data 136 may include images of the identification data 134 presented by the user 118 at the first gate 108. Continuing the example, the identification data 134 may comprise image data 136 that depicts at least a portion of a hand 210, a display of an electronic device, a pre-printed card, and so forth. In another example, if the scanner 110 comprises a near field communication (NFC) reader, the identification data 134 may comprise information obtained from an NFC tag presented by the first user 118.

A first account associated with the first identification data 134 may also be determined, as in 1206. For example, the first identification data 134 may be used to determine an affirmative identity of the first user 118, such as associated with a particular name or account number.

A first user identifier 144 may also be determined for the first user 118, as in 1208. For example, the first user identifier 144 may be assigned by the user location module 142. In some implementations, the first user identifier 144 may be associated with the first account determined using the first identification data 134.

A second entry time of the second user 118 to the facility 102 is also determined at the first entry location 104, as in 1210. The second entry time may be determined based on one or more of the gate data 128, image data 136, and so forth. For example, the second entry time may be the time when the user 118 passed through the moveable barriers 204 at the gate 108. It may also be determined that the second user 118 did not present identification data 134. For example, no identification data 134 may be received at the first gate 108 at the second time of entry.

The example process then determines that a first difference between the first entry time and the second entry time is less than a first threshold, as in 1212. For example, the first user 118 and the second user 118 have entered within the entry threshold time 908.

In this example, it is also determined that the first user 118 and the second user 118 have interacted with one another, as in 1214. For example, the user behavior data 154 may indicate that an object 1006 was passed from the first user 118 to the second user 118, or the users were within a threshold distance of one another 912 for at least a first duration.

When the first user eventually leaves the facility, a first exit time of the first user 118 from the facility 102 is determined at a first exit location 106, as in 1216. Likewise, when the second user leaves the facility, a second exit time of the second user 118 from the facility 102 is determined at the first exit location 106, as in 1218. For example, the exit times may be based on image data 136 obtained by one or more cameras 112 with fields of view of the exit location 106, or by other sensors such as sensors in the gate 108(2) at the exit location 106. In some implementations, one or more gates 108 may operate as entry locations 104 and exit locations 106 either at the same time, or at different times. A user 118 may enter at one gate 108(1) operating as an entry location 104 and exit via another gate 108(2) operating as an exit location 106.

In this example, it is then determined that a second difference between the first exit time and the second exit time is less than a second threshold, as in 1220. For example, the first user 118 and the second user 118 may have exited the facility 102 within the exit threshold time 910.

Based on the above determinations, the second user 118 is associated with the first account, as in 1222. For example, the identifier 144 of the second user 118 may be associated with the first account that is associated with the first user 118. For example, the group data 160 may be indicative of the association between the first user and the second user, the second user and the first account, and so forth.

While the techniques above are described with regard to two users 118, it is understood that the techniques may be extended to groups of any number of users. For example, first, second, and third users 118 may be in a group 308.

Figure 13:
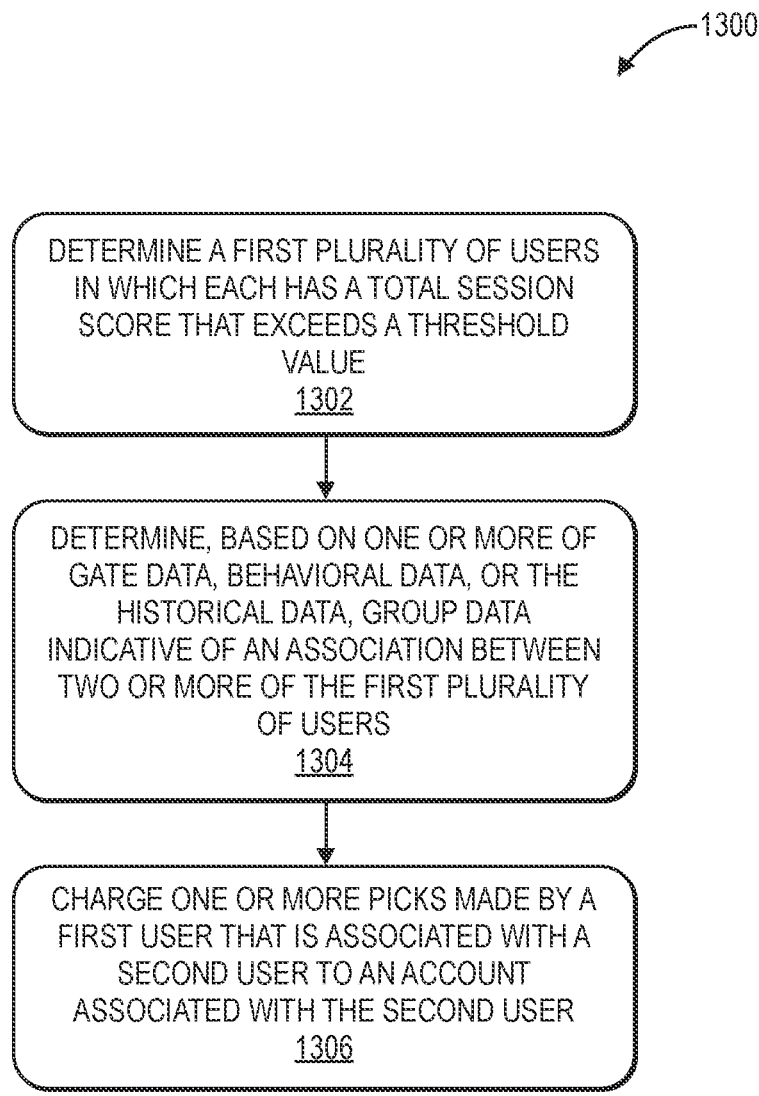
FIG. 13 illustrates a flow diagram of yet another process to determine a first user is associated with a second user, in accordance with implementations of the present disclosure.

FIG. 13 illustrates a flow diagram 1300 of yet another process to determine a first user is associated with a second user, according to some implementations. The process may be implemented at least in part by the system 100 described herein.

The example process 1300 begins by determining a first plurality of users 118 in which each user 118 has a total session score 1110 that exceeds a threshold value, as in 1302. For example, the total session score 1110 may be calculated as described above with regard to FIG. 11.

For those determined users, group data 160 is determined based on one or more of the gate data 128, the scan gesture data 140, the height data 148, the user behavior data 154, or the historical data 158, as in 1304. The group data 160 associates two or more of the first plurality of users 118 with a common group 308. For example, based on the entry and exit times and the user 118(3) placing objects 1006 into a single cart 120 associated with the user 118(2), the group data 160 is generated that indicates the third user 118(3) is associated with the second user 118(2).

In the example illustrated with respect to FIG. 13, one or more picks of items 116 that are made by one user 118 in the group 308 are charged to an account associated with another user 118 in the group 308, as in 1306. For example, a pick made by the third user 118(3) that is part of the group may be billed to an account associated with the second user 118(2). In other implementations, other charges or credits to an account may be determined based on the group data 160. For example, if the user 118(2) picks an item 116 from the inventory location 114 and passes the item 116 to the user 118(3) who then returns the item 116 to the inventory location 114, there would be no net charge to the account associated with the user 118(2).

Figure 14:
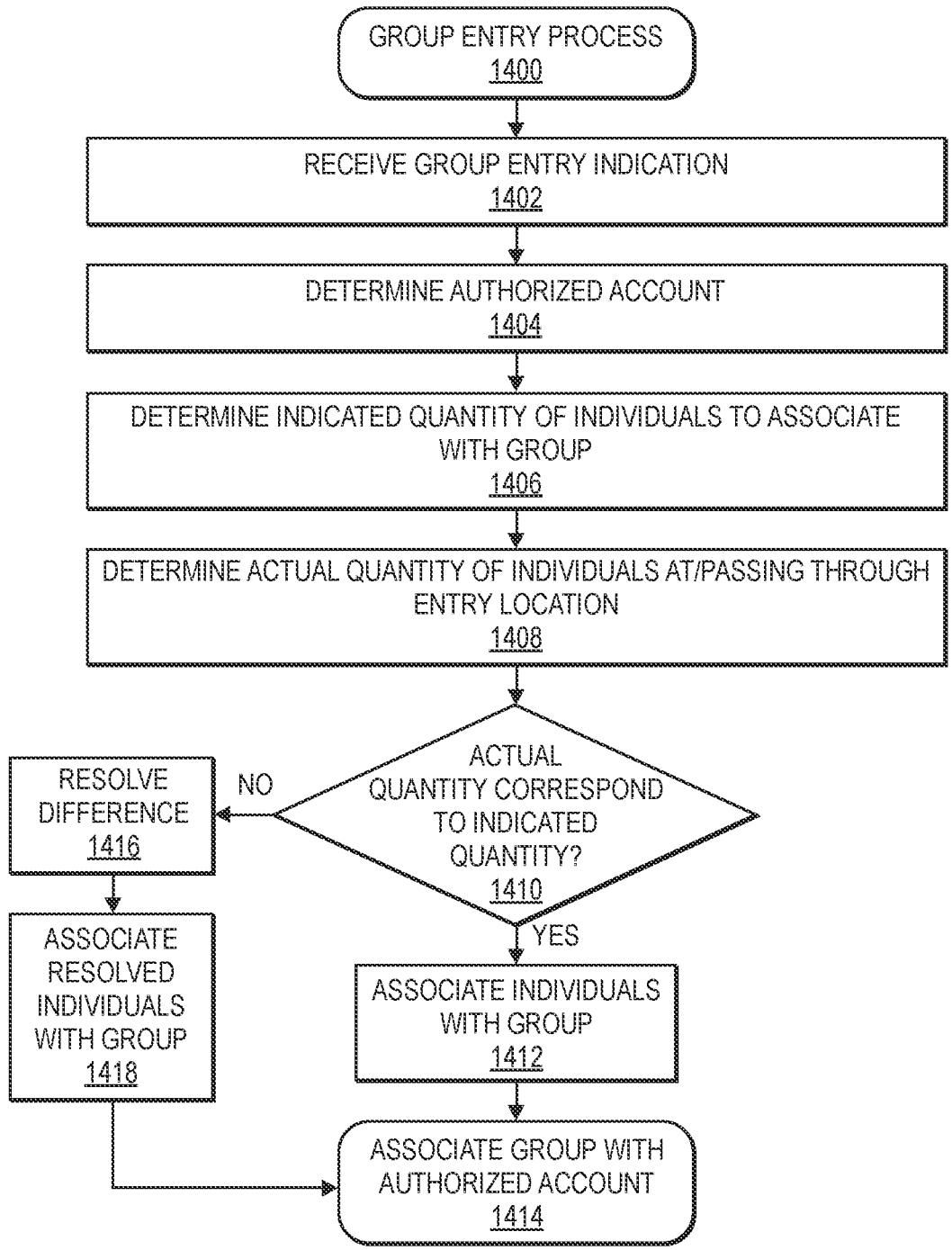
FIG. 14 illustrates an example group entry process, in accordance with implementations of the present disclosure.

FIG. 14 illustrates an example group entry process 1400, in accordance with described implementations. The example process 1400 may be implemented at least in part by the system 100 described herein.

The example process 1400 begins upon receipt of a group entry indication, as in 1402. As discussed above, a group entry indication may include, for example, a user selecting a group selection option, a quantity of individuals gathering in a defined area within an entry location, etc.

As part of group establishment, an authorized account, or accounts, to be associated with the group is also determined, as in 1404. An authorized account may be any account maintained by the disclosed implementations with which actions by group individuals and/or fees or costs incurred by the group are to be associated. For example, an authorized account may be determined by a user inserting a credit card or other identifier into an I/O device at an entry location, a user scanning a bar code, QR code or other visual identifier, by a user providing biometrics or other identifying information, etc.

The example process 1400 may also determine an indicated quantity of individuals to associate with the group, as in 1406. For example, as discussed above, a user may interact with an I/O device and select a group selection option that indicates a quantity of individuals to include in the group. The quantity may be a specific quantity of individuals or a range of a quantity of individuals to be included in the group.

In addition to determining an indicated quantity of individuals, the example process 1400 may also determine an actual quantity of individuals at or passing through the entry location, as in 1408. For example, one or more sensors (e.g., motion sensors, pressure sensors, cameras, etc.) at the entry location may generate data that is processed to determine an actual number of individuals at or passing through the entry location that are determined to be part of the indicated group.

A determination may then be made as to whether the determined actual quantity of individuals corresponds to the indicated quantity of individuals, as in 1410. For example, the actual quantity determined from the sensor data may be compared with the indicated quantity received from the user. If it is determined that the determined actual quantity of individuals corresponds to the indicated quantity of individuals, each of the determined individuals are associated as a group, as in 1412. Association of the individuals with the group may include assigning an identifier, such as a random number, with each detected individual and associating those identifiers with the group. In addition to associating each of the determined individuals with the group, the authorized account is also associated with the group, as in 1414.

Returning to decision block 1410, if it is determined that the determined actual quantity of individuals does not correspond to the indicated quantity of individuals, the difference is resolved, as in 1416. For example, the user that provided the indicated quantity may be notified, for example, via the I/O device, indicating the determined difference and the user may provide a resolution as to the quantity of individuals to include in the group. For example, if the actual quantity of individuals is determined to be greater than the indicated quantity, the user may be notified and allowed to either accept the determined actual quantity as the quantity of individuals for the group or indicate one or more determined individuals that are not to be included in the group (or added to the group). As another example, sensor data (e.g., image data) may be provided to an agent and the agent may review the data to determine and resolve the difference. In still other examples, an agent may be notified and may correspond with the user to determine and resolve the difference.

The resolved quantity of individuals are then associated with the group, as in 1418. Similar to associating the determined actual quantity of individuals with the group, association of the resolved quantity of individuals with the group may include assigning an identifier, such as a random number, with each individual included in the resolved quantity of individuals and associating those identifiers with the group. In addition to associating each of the resolved individual with the group, the authorized account(s) is also associated with the group, as in 1414.

Figure 15:
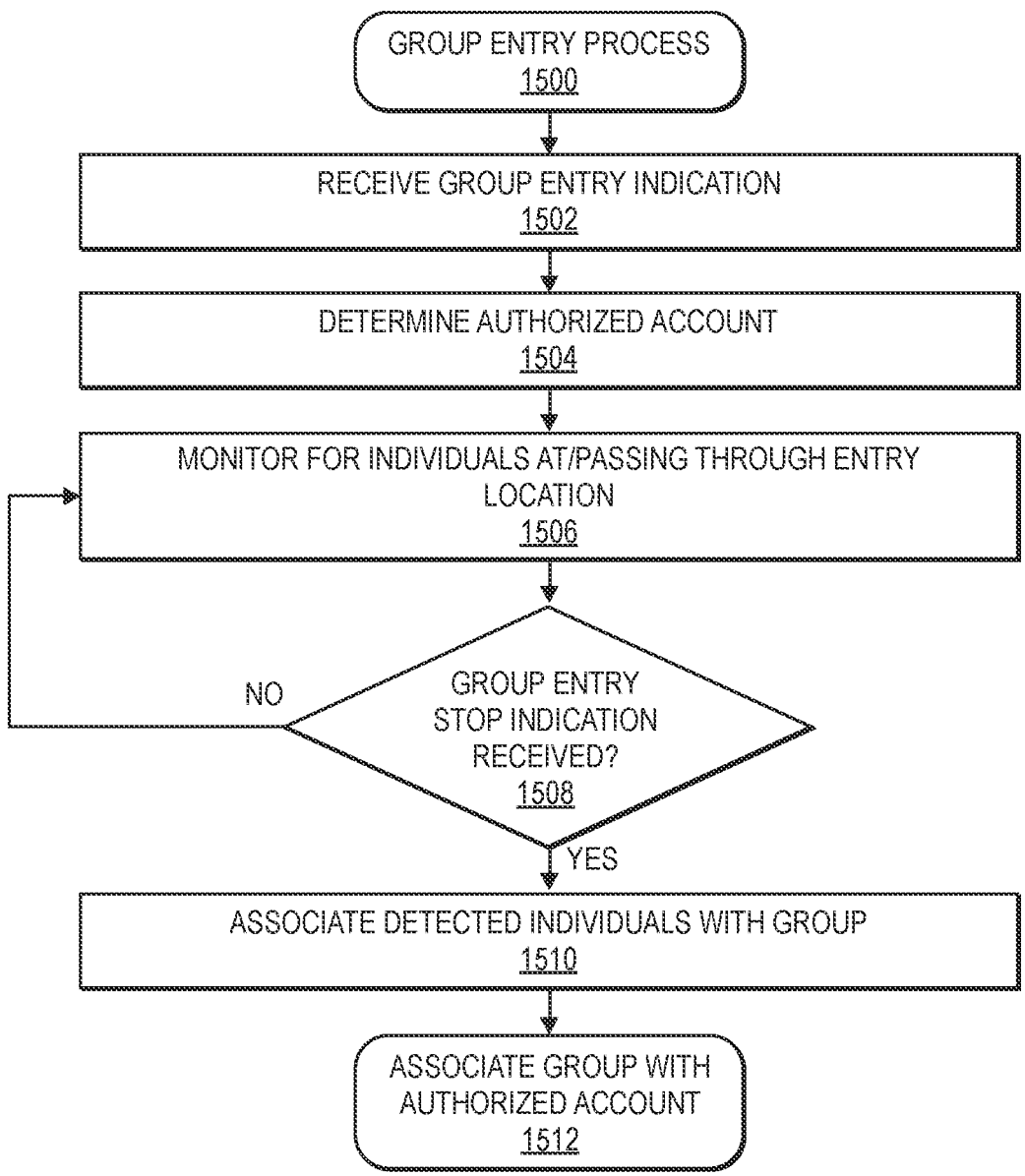
FIG. 15 illustrates another example group entry process, in accordance with implementations of the present disclosure.

FIG. 15 illustrates another example group entry process 1500, in accordance with described implementations. The example process 1500 begins upon receipt of a group entry indication, as in 1502. In this example, a user may perform an action to indicate group entry. For example, a user may insert a credit card into the I/O device, select a group selection option, or provide another indication that a group of individuals are entering that are to be included in a group.

As part of group establishment, an authorized account, or accounts, to be associated with the group is also determined, as in 1504. An authorized account may be any account maintained by the disclosed implementations with which actions by group individuals and/or fees or costs incurred by the group are to be associated. For example, an authorized account may be determined by a user inserting a credit card or other identifier into an I/O device at an entry location, a user scanning a bar code, QR code or other visual identifier, by a user providing biometrics or other identifying information, etc.

In addition to determining an authorized account, in response to receiving the group entry indication, the example process 1500 monitors the entry location for individuals at or passing through the entry location, as in 1506. As discussed above, monitoring may be performed using one or more sensors at the entry location to determine individuals at or passing through the entry location. In some implementations, group entry and monitoring for individuals to include in the group may be determined at a single gate at the entry location. In other implementations, group entry and monitoring for individuals to include in the group may be determined at multiple gates at the entry location. For example, a user at a first gate may provide a group entry indication. In response, the first gate and a second gate may be monitored for determination of individuals to include in the group. Such an implementation may be particularly beneficial in instance where one or more members of the group are entering through a different gate, such as a handicap accessible gate.

As the example process monitors for individuals to include in the group, a determination is made as to whether a group entry stop indication has been received, as in 1508. A group entry stop indication may be received in response to, for example, a user removing the identifier card from the I/O device, a defined period of time elapsing without detection of an individual at or passing through the entry location, a movable barrier on a gate closing, etc.

If it is determined that a group entry stop indication has not been received, the example process 1500 returns to block 1506 and continues. If it is determined that a group entry stop indication has been received, the detected individuals are associated with the group, as in 1510. Finally, the group is associated with the authorized account, as in 1512.

Figure 16:
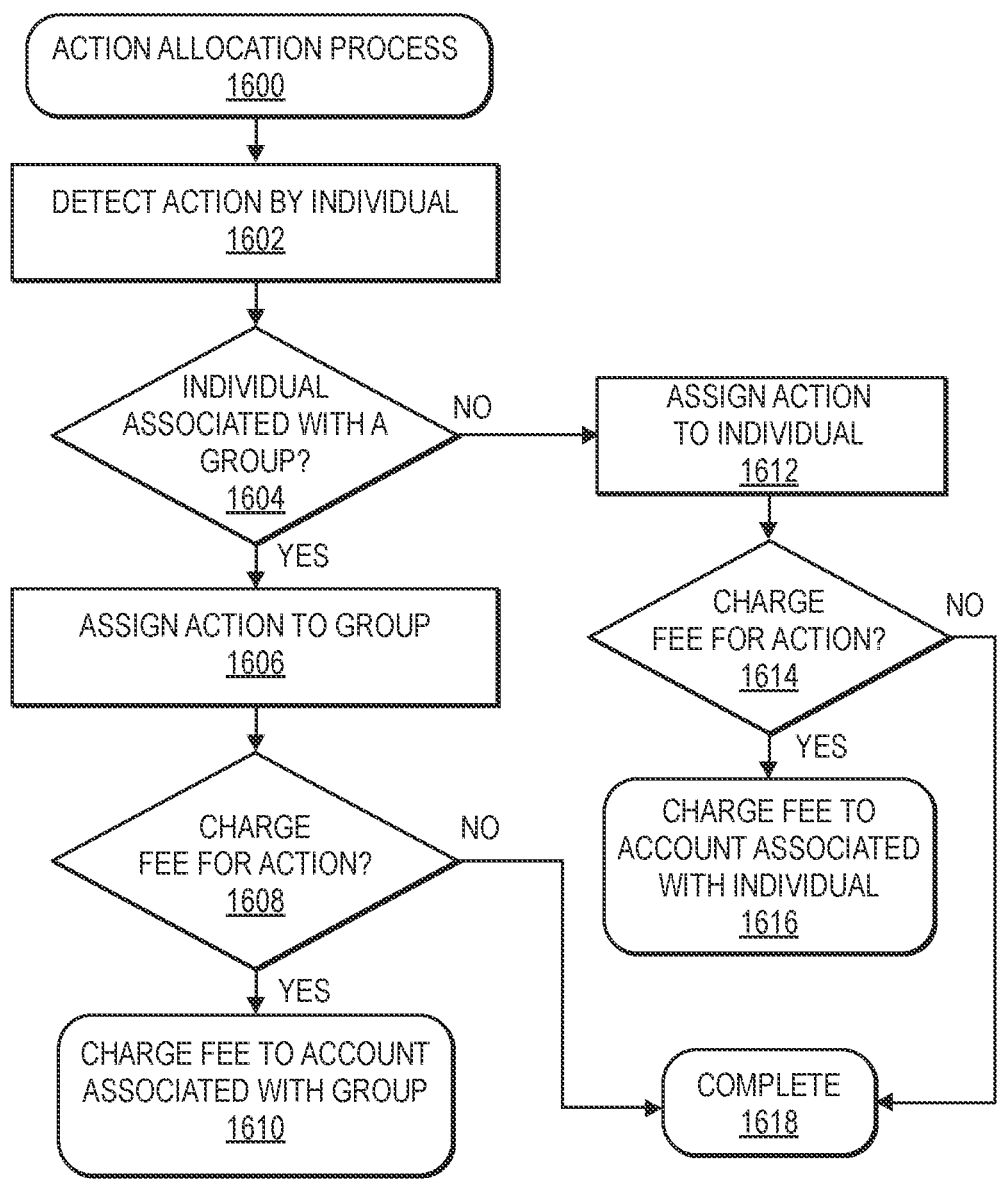
FIG. 16 illustrates an example action allocation process, in accordance with implementations of the present disclosure.

FIG. 16 illustrates an example action allocation process 1600, in accordance with described implementations.

The example process 1600 begins upon detection of an action by an individual, as in 1602. An action may include any different action performed by an individual and may vary depending on the facility in which the action occurs. For example, in facilities that include inventory, an action may include, but is not limited to, a pick of an item from an inventory location, a place of an item to an inventory location, a consumption of an item, a use of an item, etc. As another example, if the facility is an amusement park, actions may include, but are not limited to, consuming food, riding a ride, playing a game, watching or participating in a show, etc.

Upon detection of an action by an individual at the facility, a determination is made as to whether the individual is associated with a group, as in 1604. For example, a user identifier associated with the individual determined to have performed the action may be utilized to determine if that user identifier is associated with a group.

If it is determined that the individual is associated with the group, the action is associated with or assigned to the group, as in 1606. A determination may also be made as to whether a fee or other cost is to be charged for the action, as in 1608. For example, there may be fee for picked items, consumed items, rides, games, shows, etc. If it is determined that a fee or other cost is to be charged for the action, the fee or other cost is associated with the group and charged to the account or accounts associated with the group, as in 1610.

Returning to decision block 1604, if it is determined that the individual that performed the action is not associated with a group, the action is assigned to that individual, as in 1612. In addition to assigning the action to the individual, a determination may also be made as to whether a fee or other cost is to be charged for the action, as in 1614. If it is determined that a fee or other cost is to be charged for the action, the fee or other cost is associated with the individual and charged to the account associated with the group, as in 1616.

If it is determined at decision blocks 1608 or 1614 that no fee or cost is to be charged, the example process 1600 completes, as in 1618.

While the above example process distinguishes between groups and individuals, in other implementations, an individual that is alone (solo) may be treated as a group of one. In such an example, the user account of the individual is associated with the group of one and processing of actions by the individual is treated no different than processing of actions by individuals of a group greater than one.

Figure 17:
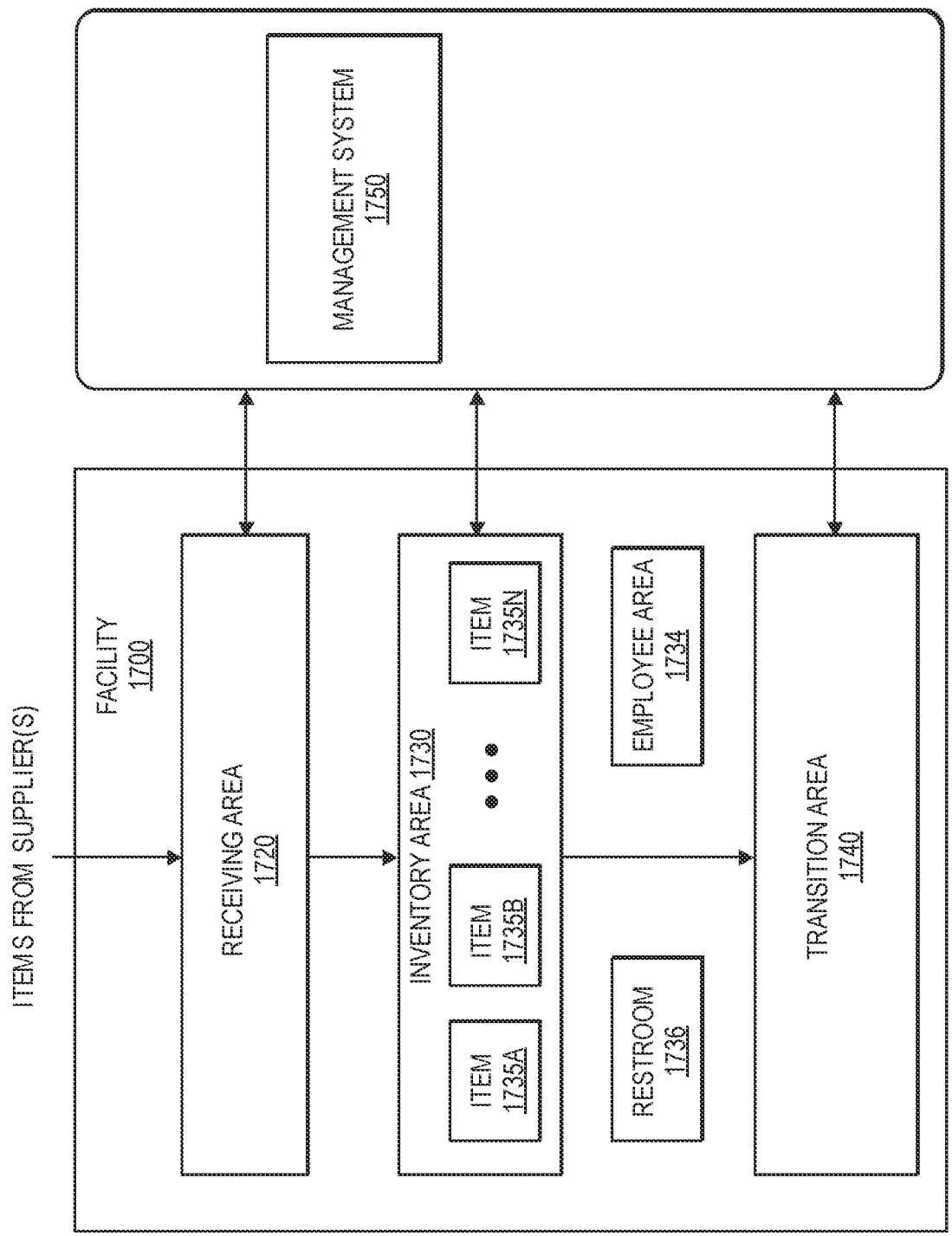
FIG. 17 is a block diagram illustrating a facility, in accordance with implementations of the present disclosure.

An implementation of an example facility configured to store and manage inventory items is illustrated in FIG. 17. As shown, a facility 1700 includes a receiving area 1720, an inventory area 1730 configured to store an arbitrary number of inventory items 1735A, 1735B, through 1735N, one or more transition areas 1740, one or more restrooms 1736, and one or more employee areas 1734 or break-rooms. The arrangement of the various areas within facility 1700 is depicted functionally rather than schematically. For example, in some implementations, multiple different receiving areas 1720, inventory areas 1730 and transition areas 1740 may be interspersed rather than segregated. Additionally, the facility 1700 includes an management system 1750(1) configured to interact with each of receiving area 1720, inventory area 1730, transition area 1740 and/or individuals within the facility 1700. Likewise, the facility includes a re-identification system 1750(2) configured to interact with image capture devices at each of the receiving area 1720, inventory area 1730, and/or transition area 1740 and to track individuals as they move throughout the facility 1700.

The facility 1700 may be configured to receive different kinds of inventory items 1735 from various suppliers and to store them until an individual orders or retrieves one or more of the items. The general flow of items through the facility 1700 is indicated using arrows. Specifically, as illustrated in this example, items 1735 may be received from one or more suppliers, such as manufacturers, distributors, wholesalers, etc., at receiving area 1720. In various implementations, items 1735 may include merchandise, commodities, perishables, or any suitable type of item depending on the nature of the enterprise that operates the facility 1700.

Upon being received from a supplier at receiving area 1720, items 1735 may be prepared for storage. For example, in some implementations, items 1735 may be unpacked or otherwise rearranged and the management system (which, as described below, may include one or more software applications executing on a computer system) may be updated to reflect the type, quantity, condition, cost, location or any other suitable parameters with respect to newly received items 1735. It is noted that items 1735 may be stocked, managed or dispensed in terms of countable, individual units or multiples of units, such as packages, cartons, crates, pallets or other suitable aggregations. Alternatively, some items 1735, such as bulk products, commodities, etc., may be stored in continuous or arbitrarily divisible amounts that may not be inherently organized into countable units. Such items 1735 may be managed in terms of measurable quantities such as units of length, area, volume, weight, time duration or other dimensional properties characterized by units of measurement. Generally speaking, a quantity of an item 1735 may refer to either a countable number of individual or aggregate units of an item 1735 or a measurable amount of an item 1735, as appropriate.

After arriving through receiving area 1720, items 1735 may be stored within inventory area 1730 on an inventory shelf. In some implementations, like items 1735 may be stored or displayed together in bins, on shelves or via other suitable storage mechanisms, such that all items 1735 of a given kind are stored in one location. In other implementations, like items 1735 may be stored in different locations. For example, to optimize retrieval of certain items 1735 having high turnover or velocity within a large physical facility, those items 1735 may be stored in several different locations to reduce congestion that might occur at a single point of storage.

When an order specifying one or more items 1735 is received, or as an individual progresses through the facility 1700, the corresponding items 1735 may be selected or "picked" from the inventory area 1730. For example, in one implementation, an individual may have a list of items to pick and may progress through the facility picking items 1735 from the inventory area 1730. In other implementations, facility employees (referred to herein as agents) may pick items 1735 using written or electronic pick lists derived from orders. In some instances, an item may need to be repositioned from one location within the inventory area 1730 to another location. For example, in some instances, an item may be picked from its inventory location, moved a distance and placed at another location.

Figure 18:
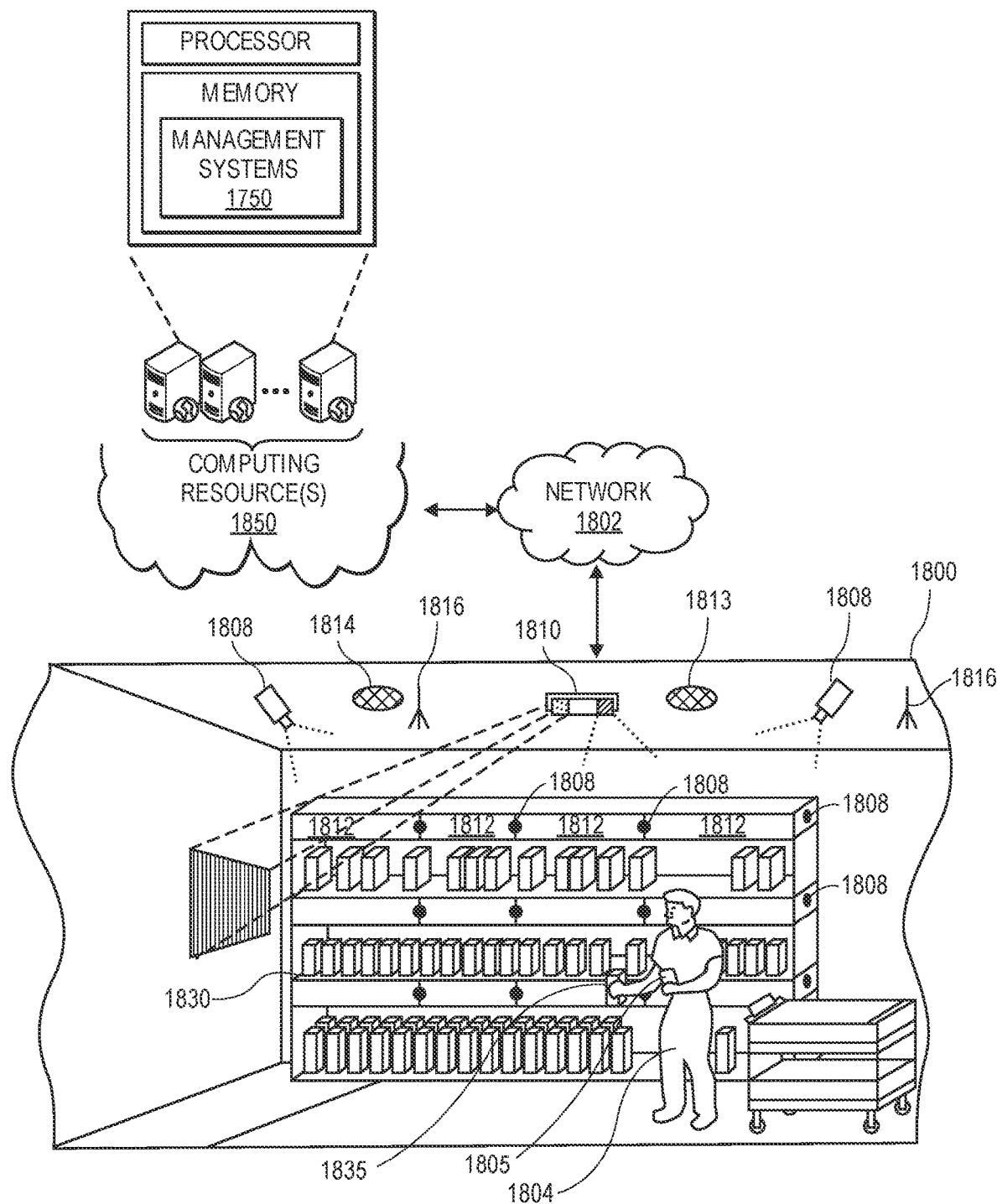
FIG. 18 shows additional components of the facility of FIG. 17, in accordance with implementations of the present disclosure.

FIG. 18 shows additional components of a facility 1800, according to one implementation. Generally, the facility 1800 may include one or more image capture devices, such as cameras 1808. For example, one or more cameras 1808 may be positioned in locations of the facility 1800 so that images of locations, items, and/or individuals within the facility can be captured. In some implementations, the image capture devices 1808 may be positioned overhead, such as on the ceiling, and oriented toward a surface (e.g., floor) of the material handling facility so that the image capture devices 1808 are approximately perpendicular with the surface and the field of view is oriented toward the surface. The overhead image capture devices may then be used to capture images of individuals and/or locations within the facility from an overhead view. In addition, in some implementations, one or more cameras 1808 may be positioned on or inside of inventory areas. For example, a series of cameras 1808 may be positioned on external portions of the inventory areas and positioned to capture images of individuals and/or the location surrounding the inventory area.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., an individual's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an individual 1804 arrives at the facility 1800, one or more images of the individual 1804 may be captured and processed as discussed herein. For example, the images of the individual 1804 may be processed to identify the individual and/or generate a feature set that includes embedding vectors representative of the individual. In some implementations, rather than or in addition to processing images to identify the individual 1804, other techniques may be utilized to identify the individual. For example, the individual may provide an identification (e.g., user name, password), the individual may present an identifier (e.g., identification badge, card), an RFID tag in the possession of the individual may be detected, a visual tag (e.g., barcode, bokode, watermark) in the possession of the individual may be detected, biometrics may be utilized to identify the individual, a smart phone or other device associated with the individual may be detected and/or scanned, etc.

For example, an individual 1804 located in the facility 1800 may possess a portable device 1805 that is used to identify the individual 1804 when they enter the facility and/or to provide information about items located within the facility 1800, receive confirmation that the management system has correctly identified items that are picked and/or placed by the individual, confirm group associations, receive requests for confirmation regarding one or more event aspects, etc. Generally, the portable device has at least a wireless module to facilitate communication with the management systems 1750 and a display (e.g., a touch based display) to facilitate visible presentation to and interaction with the individual. The portable device may store a unique identifier and provide that unique identifier to the management systems 1750 and be used to identify the individual. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 1750. Likewise, components of the management systems 1750 may interact and communicate with the portable device as well as identify the individual, communicate with the individual via other means and/or communicate with other components of the management systems 1750.

Generally, the management systems 1750 may include one or more input/output devices, such as imaging devices (e.g., cameras) 1808, projectors 1810, displays 1812, speakers 1813, microphones 1814, multiple-camera apparatus, illumination elements (e.g., lights), etc., to facilitate communication between the management systems 1750 and/or the individual and detection of items, events and/or other actions within the facility 1800. In some implementations, multiple input/output devices may be distributed within the facility 1800. For example, there may be multiple imaging devices, such as cameras located on the ceilings and/or cameras (such as pico-cameras) located in the aisles near the inventory items.

Likewise, the management systems 1750 may also include one or more communication devices, such as wireless antennas 1816, which facilitate wireless communication (e.g., Wi-Fi, Near Field Communication (NFC), Bluetooth) between the management systems 1750 and other components or devices. The management systems 1750 may also include one or more computing resource(s) 1850, such as a server system, that may be local to the environment (e.g., facility), remote from the environment, or any combination thereof.

The management systems 1750 may utilize antennas 1816 within the facility 1800 to create a network 1802(e.g., Wi-Fi) so that the components and devices can connect to and communicate with the management systems 1750. For example, when the individual picks an item 1835 from an inventory area 1830, a camera 1808 may detect the removal of the item and the management systems 1750 may receive information, such as image data of the performed action (item pick from the inventory area), identifying that an item has been picked from the inventory area 1830. The event aspects (e.g., user identity, action performed, item involved in the event) may then be determined by the management systems 1750.

Figure 19:
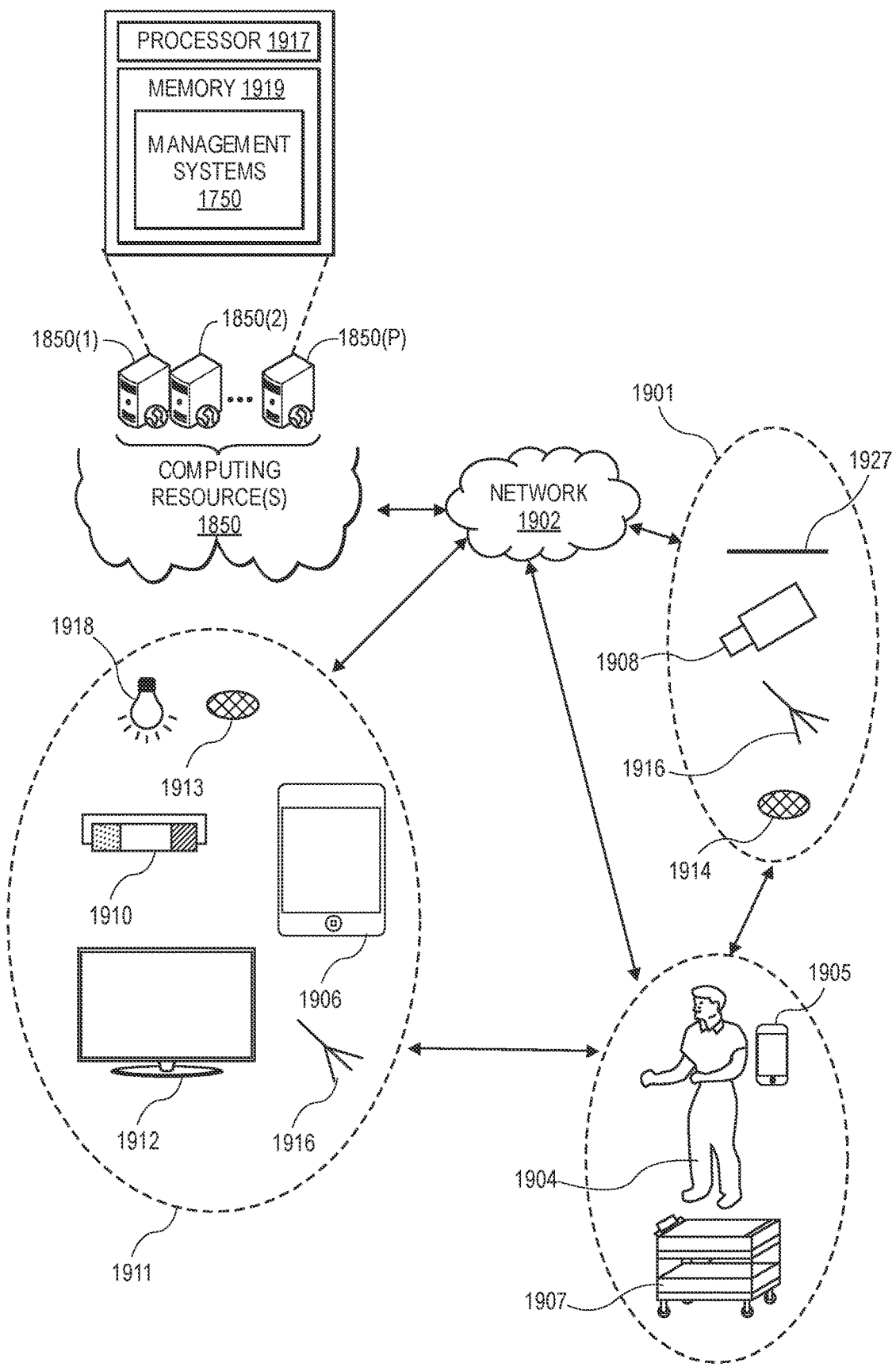
FIG. 19 shows components and communication paths between component types utilized in a facility of FIG. 17, in accordance with implementations of the present disclosure.

FIG. 19 shows example components and communication paths between component types utilized in a facility 1700, in accordance with one implementation. A portable device 1905 may communicate and interact with various components of management systems 1750 over a variety of communication paths. Generally, the management systems 1750 may include input components 1901, output components 1911 and computing resource(s) 1850. The input components 1901 may include an imaging device 1908, a multiple-camera apparatus 1927, microphone 1914, antenna 1916, or any other component that is capable of receiving input about the surrounding environment and/or from the individual. The output components 1911 may include a projector 1910, a portable device 1906, a display 1912, an antenna 1916, a radio, speakers 1913, illumination elements 1918 (e.g., lights), and/or any other component that is capable of providing output to the surrounding environment and/or the individual.

The management systems 1750 may also include computing resource(s) 1850. The computing resource(s) 1850 may be local to the environment (e.g., facility), remote from the environment, or any combination thereof. Likewise, the computing resource(s) 1850 may be configured to communicate over a network 1902 with input components 1901, output components 1911 and/or directly with the portable device 1905, an individual 1904 and/or a tote 1907.

As illustrated, the computing resource(s) 1850 may be remote from the environment and implemented as one or more servers 1850(1), 1850(2), . . . , 1850(P) and may, in some instances, form a portion of a network-accessible computing platform implemented as a computing infrastructure of processors, storage, software, data access, and so forth that is maintained and accessible by components/devices of the management systems 1750 and/or the portable device 1905 via a network 1902, such as an intranet (e.g., local area network), the Internet, etc. The server system 1850 may process images of an individual to identify the individual, determine groups of individuals, process images of items to identify items, determine a location of items and/or determine a position of items. The server system(s) 1850 does not require end-user knowledge of the physical location and configuration of the system that delivers the services. Common expressions associated for these remote computing resource(s) 1850 include "on-demand computing," "software as a service (SaaS)," "platform computing," "network-accessible platform," "cloud services," "data centers," and so forth.

Each of the servers 1850(1)-(P) include a processor 1917 and memory 1919, which may store or otherwise have access to a management systems 1750, which may include or provide image processing (e.g., for user identification, expression identification, and/or item identification), inventory tracking, and/or location determination.

The network 1902 may utilize wired technologies (e.g., wires, USB, fiber optic cable, etc.), wireless technologies (e.g., radio frequency, infrared, NFC, cellular, satellite, Bluetooth, etc.), or other connection technologies. The network 1902 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 20:
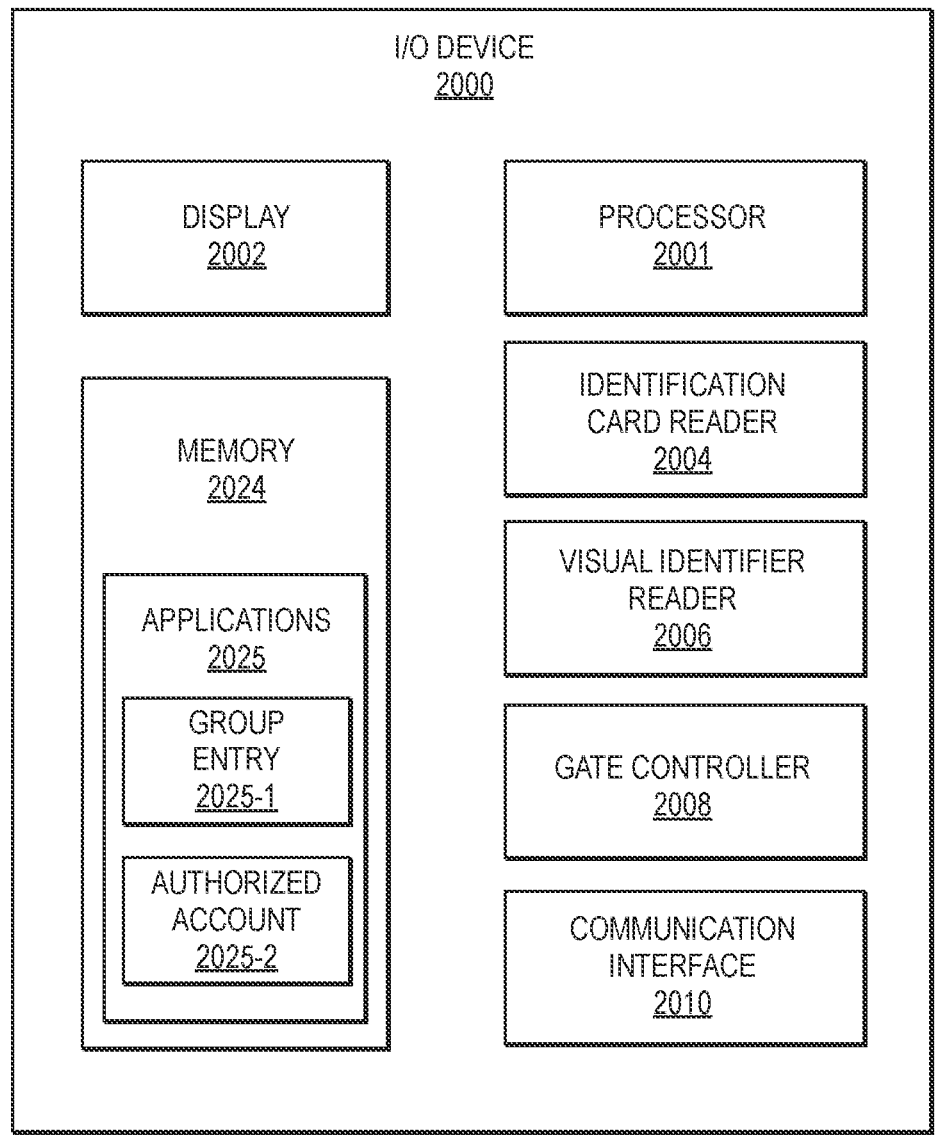
FIG. 20 is a block diagram of an illustrative implementation of an input/output device, in accordance with implementations of the present disclosure.

FIG. 20 is a block diagram of an illustrative implementation of an I/O device, such as the I/O 700 discussed above with respect to FIG. 7, in accordance with implementations of the present disclosure.

As discussed above, the I/O device 2000 may include a display 2002, such as a touch-based display, an identification card reader 2004, such as a credit card reader, and/or a visual identifier reader 2006. In some implementations, the I/O device may also include a gate controller 2008 that is operable to open or close the movable barrier of one or more gates in response to receiving an identifier from a user, receiving a group selection option, etc.

The I/O device may also include one or more processors 2001 and a memory 2024 storing program instructions, such as applications 2025, that are executable by the one or more processors to cause the one or more processors to perform various actions. For example, the applications may include a group entry 2025-1 application and/or an authorized account 2025-2 application. The group entry application 2025-1 may be configured to present group selection options on the display 2002 and/or to receive a selection of a group selection option. Still further, the group entry 2025-1 may further operate with the gate controller 2008 to open or close the movable barrier of the gate in response to receiving input, such as a group selection option, from a user. The authorized account 2025-2 application may be operable to determine an authorized account to associate with a defined group. For example, the authorized account 2025-2 application may determine from the identifier provided to the identification card reader 2004 and/or visual identifier reader an authorized account to associate with a group of individuals.

The I/O device may likewise include a communication interface 2010 that enables wired or wireless communication between the I/O device 2000 and other devices, such as a server or the management system.

While the example I/O device 2000 describes applications such as a group entry 2025-1 and an authorized account 2025-2 application, in other implementations, the I/O device 2000 may include additional or fewer applications. For example, in some implementations, all processing may be done remote from the I/O device and the I/O device 2000 may only send information to the remote systems for processing.

Figure 21:
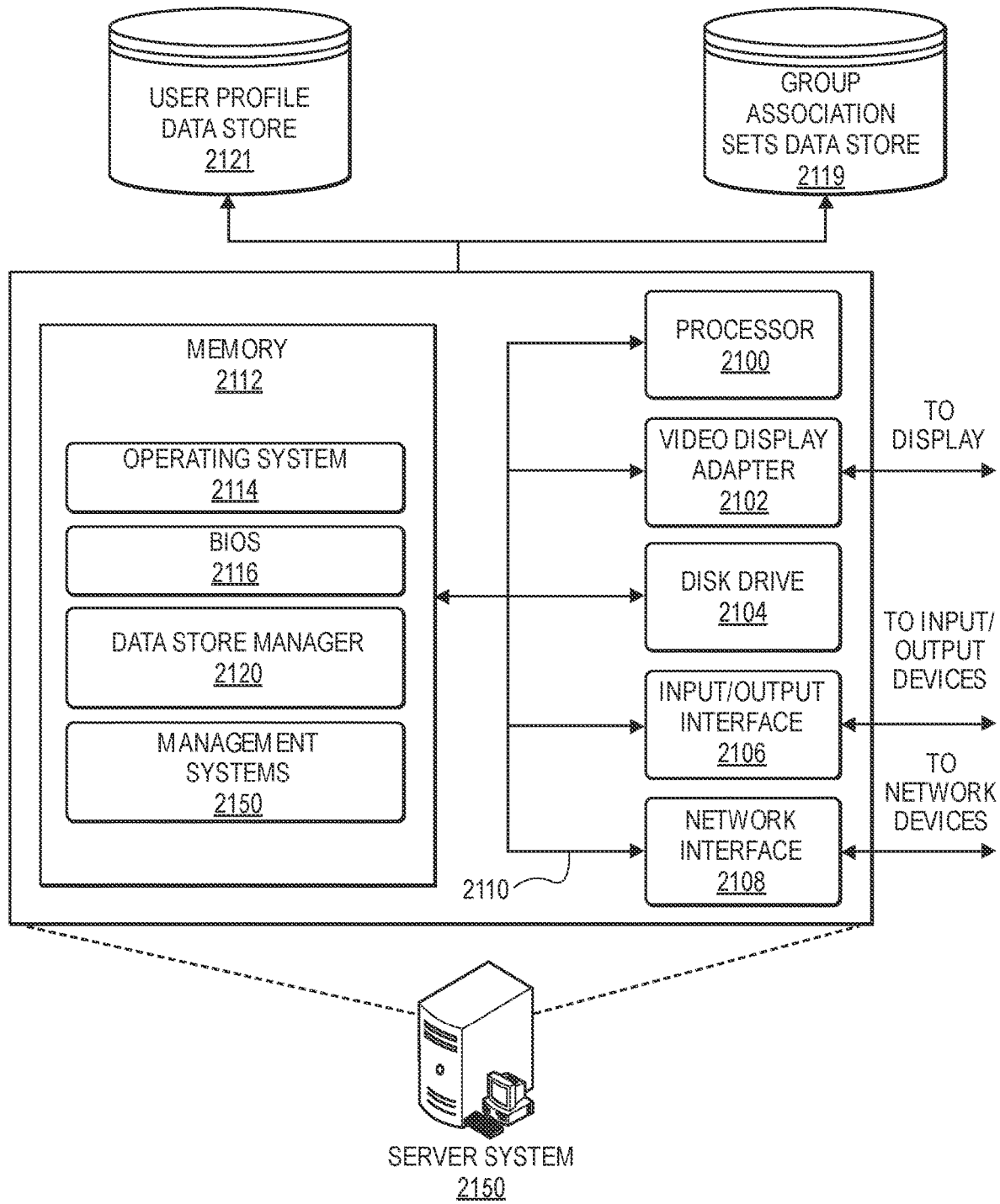
FIG. 21 is a block diagram of an illustrative implementation of a server system that may be used with various implementations.

FIG. 21 is a pictorial diagram of an illustrative implementation of a server system, such as the server system 124 of FIG. 1 and/or the server system 1850 of FIG. 18 that may be used in the implementations described herein. The server system illustrated in FIG. 21 or another similar server system may be configured to operate as the management system 1750.

The server system 1850 may include a processor 2100, such as one or more redundant processors, a video display adapter 2102, a disk drive 2104, an input/output interface 2106, a network interface 2108, and a memory 2112. The processor 2100, the video display adapter 2102, the disk drive 2104, the input/output interface 2106, the network interface 2108, and the memory 2112 may be communicatively coupled to each other by a communication bus 2110.

The video display adapter 2102 provides display signals to a local display permitting an operator of the server system 1850 to monitor and configure operation of the server system 1850. The input/output interface 2106 likewise communicates with external input/output devices, such as a mouse, keyboard, scanner, or other input and output devices that can be operated by an operator of the server system 1850. The network interface 2108 includes hardware, software, or any combination thereof, to communicate with other computing devices. For example, the network interface 2108 may be configured to provide communications between the server system 1850 and other computing devices via the network 1902, as shown in FIG. 19.

The memory 2112 may be a non-transitory computer readable storage medium configured to store executable instructions accessible by the processor(s) 2100. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 2108.

The memory 2112 is shown storing an operating system 2114 for controlling the operation of the server system 1850. A binary input/output system (BIOS) 2116 for controlling the low-level operation of the server system 1850 is also stored in the memory 2112. The memory 2112 additionally stores computer executable instructions, that, when executed by the processor 2100 cause the processor to perform one or more of the processes discussed herein. The memory 2112 additionally stores program code and data for providing network services. The data store manager application 2120 facilitates data exchange between the data stores 2119, 2121 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 1850 can include any appropriate hardware and software for integrating with the data stores 2119, 2121 as needed to execute aspects of the management systems 1850.

The data stores 2119, 2121 can include several separate data tables, databases or other data storage mechanisms and media for storing data relating to a particular aspect. For example, the data stores 2119, 2121 illustrated include mechanisms for maintaining user profiles, group associations, etc. Depending on the configuration and use of the server system 1850, one or more of the data stores may not be included or accessible to the server system 1850 and/or other data store may be included or accessible.

It should be understood that there can be many other aspects that may be stored in the data stores 2119, 2121. The data stores 2119, 2121 are operable, through logic associated therewith, to receive instructions from the server system 1850 and obtain, update or otherwise process data in response thereto.

The memory 2112 may also include the management system 2150. The corresponding server system 1850 may be executable by the processor 2100 to implement one or more of the functions of the server system 1850. In one implementation, the server system 1850 may represent instructions embodied in one or more software programs stored in the memory 2112. In another implementation, the system 1850 can represent hardware, software instructions, or a combination thereof.

The server system 1850, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 21. Thus, the depiction in FIG. 21 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 12 through 16, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
   a facility having an entry location;
   a defined area within the entry location at which individuals that are to be included in a grouping are to gather;
   a display within the entry location that includes instructions that individuals that desire to be included in a group stand in the defined area;
   one or more processors; and
   a memory storing program instructions that, when executed by the one or more processors, cause the one or more processors to at least:
      monitor, during a period of time, the defined area to determine a plurality of individuals within the defined area during the period of time;
      determine that a stop indication has been received for a group entry;
      associate each of the plurality of individuals with the group in response to receipt of the stop indication; and
      associate the group with an account of a first user.

2. The system of claim 1,
   further comprising a camera oriented toward the defined area; and
   wherein the program instructions that, when executed by the one or more processors, further cause the one or more processors to at least:
      receive image data generated by the camera; and
      process the image data to determine a number of the plurality of individuals.

3. The system of claim 2, wherein the program instructions that, when executed by the one or more processors, further cause the one or more processors to at least:
   process the image data to determine, for a first individual of the plurality of individuals, an identifier that is used to monitor a position of the first individual while the first individual is in the facility.

4. The system of claim 1, wherein the program instructions that, when executed by the one or more processors, further cause the one or more processors to at least:
   detect an action performed by one of the plurality of individuals; and
   associate the action with the group.

5. The system of claim 4, wherein the program instructions that, when executed by the one or more processors, further cause the one or more processors to at least:
   subsequent to associating the action with the group, charging a fee to the account.

6. A computer-implemented method, comprising:
   presenting, using a display, instructions that individuals that desire to be included in a group stand in a defined area within an entry location of a facility;
   monitoring, during a period of time, the defined area to determine a plurality of individuals within the defined area during the period of time;
   determining that a group entry stop indication has been received;

associating each of the plurality of individuals with the group in response to determination of receipt of the group entry stop indication; and associating the group with an account of a first user.

7. The computer-implemented method of claim 6, further comprising:

processing image data generated by one or more cameras positioned within the facility to determine a first action performed by a first individual of the plurality of individuals; and associating at least one of the first action or an item involved in the first action with at least one of the group, the account, or the first user.

8. The computer-implemented method of claim 6, further comprising:

activating at least one gate at the entry location to allow passage of the plurality of individuals through the at least one gate.

9. The computer-implemented method of claim 6, further comprising:

receiving, from the first user, an indication of at least one of the account or a quantity of the plurality of individuals.

10. The computer-implemented method of claim 6, wherein the facility is at least one of a warehouse, a museum, a park, an amusement park, a hotel, a library, a mall, a retail establishment, a stadium, an event center, a transportation facility, or a private facility.

11. The computer-implemented method of claim 6, wherein the defined area is at least one of indicated on a floor of the entry location, a physically constrained area within the entry location, or the entry location.

12. The computer-implemented method of claim 6, further comprising:

processing image data received from a camera oriented toward the entry location to determine, for a first individual of the plurality of individuals, an identifier that is used to monitor a position of the first individual while the first individual is in the facility.

13. A system, comprising:

a defined area at which individuals that are to be included in a grouping are to gather;

a display that includes instructions that individuals that desire to be included in the grouping stand in the defined area;

one or more processors; and a memory storing program instructions that, when executed by the one or more processors, cause the one or more processors to at least:

monitor, during a period of time, the defined area to determine a plurality of individuals within the defined area during the period of time;

determine that a group entry stop indication has been received; and associate each of the plurality of individuals with a group in response to determination of receipt of the group entry stop indication.

14. The system of claim 13, wherein the program instructions that, when executed by the one or more processors, further cause the one or more processors to at least:

associate the group with an account of a first user.

15. The system of claim 13, further comprising:

a camera oriented toward the defined area; and wherein the program instructions that, when executed by the one or more processors to cause the one or more processors to monitor, further include instructions that cause the one or more processors to at least:

receive image data from the camera; and process the image data to determine, for each of the plurality of individuals, an identifier that is used to monitor positions of each of the plurality of individuals.

16. The system of claim 13, wherein the defined area is at least one of indicated on a floor, at an entry location of a retail facility, or a physically constrained area.

17. The computer-implemented method of claim 6, wherein:

the determining that the group entry stop indication has been received includes determining removal of at least one of an identifier or a payment instrument from detection by a reader device.

18. The computer-implemented method of claim 6, wherein the display is an electronic display device, and further comprising:

causing the display device to present a plurality of group selection options that are selectable by a first individual to generate a group entry indication, wherein:

a first group selection option corresponds to a first range of individuals, wherein the first range of individuals has a first lowest value that is less than or equal to the plurality of individuals and a first highest value that is greater than or equal to the plurality of individuals; and a second group selection option corresponds to a second range of individuals, wherein the second range of individuals has a second lowest value that is greater than the first highest value; and receiving, as the group entry indication, a selection of at least one of the first group selection option or the second group selection option.

19. The system of claim 1, wherein the program instructions that, when executed by the one or more processors, cause the one or more processors to determine that the stop indication has been received for the group entry, further cause the one or more processors to:

determine removal of at least one of an identifier or a payment instrument from detection by a reader device as the receipt of the stop indication.

20. The system of claim 13, wherein the program instructions that, when executed by the one or more processors, cause the one or more processors to determine that the group entry stop indication has been received, further cause the one or more processors to:

determine removal of at least one of an identifier or a payment instrument from detection by a reader device as the receipt of the group entry stop indication.

* * * * *